US011272555B2

(12) United States Patent
Lu et al.

(10) Patent No.: US 11,272,555 B2
(45) Date of Patent: Mar. 8, 2022

(54) DATA TRANSMISSION CHANNEL PROCESSING METHOD, APPARATUS, AND SYSTEM

(71) Applicant: Huawei Technologies Co., Ltd., Shenzhen (CN)

(72) Inventors: Wei Lu, Shenzhen (CN); Huan Li, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/850,346

(22) Filed: Apr. 16, 2020

(65) Prior Publication Data

US 2020/0245383 A1 Jul. 30, 2020

Related U.S. Application Data

(63) Continuation of application No. PCT/CN2018/110499, filed on Oct. 16, 2018.

(30) Foreign Application Priority Data

Oct. 17, 2017 (CN) .......................... 201710965328.0
May 22, 2018 (CN) .......................... 201810497140.2

(51) Int. Cl.
*H04W 28/08* (2009.01)
*H04W 76/12* (2018.01)

(52) U.S. Cl.
CPC ......... *H04W 76/12* (2018.02); *H04W 28/085* (2013.01)

(58) Field of Classification Search
CPC ... H04W 76/12; H04W 28/085; H04W 28/08; H04W 76/15; H04W 28/0819; H04W 76/16; H04W 48/16; H04W 48/18
See application file for complete search history.

(56) References Cited

U.S. PATENT DOCUMENTS

2009/0042576 A1  2/2009  Mukherjee et al.
2010/0142379 A1*  6/2010  Kim .................. H04L 43/00
                                                   370/241

(Continued)

FOREIGN PATENT DOCUMENTS

CN    104796227 A    7/2015
JP    2017523629 A    8/2017

(Continued)

OTHER PUBLICATIONS

"3rd Generation Partnership Project; Technical Specification Group Services and System Aspects; Study on Architecture for Next Generation System (Release 14)," 3GPP TR 23.799 V0.6.0, Jul. 2016, 321 pages.

(Continued)

*Primary Examiner* — Nathan S Taylor
(74) *Attorney, Agent, or Firm* — Slater Matsil, LLP

(57) ABSTRACT

A data transmission channel processing method, an apparatus and a system, the method comprising determining, by a session management network element, that a data flow of a packet data unit (PDU) session of a terminal needs to be offloaded, where the PDU session is established by using a 3rd generation partnership project (3GPP) access technology and a non-3GPP access technology, and determining, by the session management network element, to insert an offloading device into a data path of the PDU session, where the data path of the PDU session includes a data transmission channel in the 3GPP access technology or a data transmission channel in the non-3GPP access technology.

18 Claims, 10 Drawing Sheets

(56) References Cited

U.S. PATENT DOCUMENTS

| | | | |
|---|---|---|---|
| 2014/0094142 A1* | 4/2014 | Torres | H04W 12/068 455/411 |
| 2015/0334597 A1 | 11/2015 | Peisa et al. | |
| 2016/0345262 A1* | 11/2016 | Jain | H04W 52/0212 |
| 2017/0208532 A1* | 7/2017 | Zhou | H04L 69/16 |
| 2018/0027451 A1* | 1/2018 | Sun | H04W 28/12 370/235 |
| 2018/0192390 A1* | 7/2018 | Li | H04W 36/14 |
| 2020/0112881 A1* | 4/2020 | Lu | H04W 36/12 |
| 2020/0154390 A1* | 5/2020 | Kim | H04L 65/1016 |
| 2021/0014765 A1* | 1/2021 | Shan | H04W 8/02 |
| 2021/0029586 A1* | 1/2021 | Zhu | H04W 28/12 |

FOREIGN PATENT DOCUMENTS

| | | |
|---|---|---|
| WO | 2015200263 A1 | 12/2015 |
| WO | 2016155011 A1 | 10/2016 |

OTHER PUBLICATIONS

"3rd Generation Partnership Project; Technical Specification Group Services and System Aspects; System Architecture for the 5G System; Stage 2 (Release 15)," 3GPP TS 23.501 V1.4.0, Sep. 2017, 151 pages.

"3rd Generation Partnership Project; Technical Specification Group Services and System Aspects; Procedures for the 5G System; Stage 2 (Release 15)." 3GPP TS 23.502 V1.2.0 , Sep. 2017, 165 pages.

"Refining the Interim Agreements on KI 5/6," Source: Nokia, Alcatel-Lucent Shanghai Bell, Ericsson, Document for: Approval, Agenda Item: 6.10.6, Work Item/Release: NextGen/Rel14, SA WG2 Meeting #118, SA WG2 Temporary Document, S2-166354, Nov. 14-18, 206, 6 pages.

"TS 23.501: Update on PDU Session Anchor and Session and Service Continuity," Source: Samsung, Document for: Approval, Agenda Item: 6.5.3, Work Item/Release: 5G_ph1/Rel-15, SA WG2 Meeting #122Bis, SA WG2 Temporary Document, S2-176479, Aug. 21-25, 2017, 7 pages.

"TS 23.501: 5GS Terminology Corrections and Alignment," Source: Nokia, Nokia Shanghai Bell, Document for: Approval, Agenda Item: 11, Work Item/Release: 5G_ph1/Rel-15, SA WG2 Meeting #122E, S2-176756, Sep. 13-15, 2017, 65 pages.

"TS 23.501; System Architecture for the 5G System for Information," Source; SA WG2, Document for: Information, Agenda Item: 15B.1, Work Item/Release:: 5GS_Ph1/Rel-15, SA WG2 Temporary Document, 3GPP TSG SA Meeting #77, TD SP-170736, Sep. 13-15, 2017, 3GPP SA WG2 Meeting #122bis, Aug. 21-25, 2017, S2-176565, 20 pages.

"Presentation of TR 23.799: Study on Architecture for Next Generation System (Release 14) for Approval," Source: SA WG2; Document for: Approval, Agenda Item: 16B.1, Work Item/Release: FS_NextGen/Rel-14, 3GPP TSG SA Meeting #74, SP-160829, Dec. 709, 2016, 20 pages.

"3rd Generation Partnership Project; Technical Specification Group Services and System Aspects; Study on Architecture for Next Generation System (Release 14)," 3GPP TR 23.799 V14.0.0, Dec. 2016, 522 pages.

* cited by examiner

DATA TRANSMISSION CHANNEL PROCESSING METHOD, APPARATUS, AND SYSTEM

CROSS-REFERENCE TO RELATED APPLICATIONS

This application is a continuation of International Application No. PCT/CN2018/110499, filed on Oct. 16, 2018, which claims priority to Chinese Patent Application No. 201710965328.0 filed on Oct. 17, 2017, and to Chinese Patent Application No. 201810497140.2 filed on May 22, 2018. The disclosures of the aforementioned applications are hereby incorporated by reference in their entireties.

TECHNICAL FIELD

This application relates to the field of communications technologies, and in particular, to a data transmission channel processing method, an apparatus, and a system.

BACKGROUND

When accessing a data network (DN), a terminal may access the DN by using a 3rd generation partnership project (3GPP) access technology or a non-3GPP access technology, or may access the DN by using both a 3GPP access technology and a non-3GPP access technology.

When the terminal accesses the DN by using the 3GPP access technology, to support data flow offloading, a session management function (SMF) entity may control a packet data unit (PDU) session to support at least two N6 interfaces. The N6 interface is an interface between a user plane function (UPF) entity and the DN. FIG. 1 is a schematic diagram of a network architecture when a terminal accesses a DN by using a 3GPP access technology. The network architecture includes the terminal, an access network (AN), an access and mobility management function (AMF) entity, an SMF entity, UPF entities, and the DN. The UPF entities include a UPF entity having a function of an uplink classifier (UL CL), a UPF entity serving as a PDU session anchor 1, and a UPF entity serving as a PDU session anchor 2. Optionally, the DN may include a local network. For ease of description, the UPF entity having the function of the UL CL may be described as a UL CL device, the UPF entity serving as the PDU session anchor 1 may be described as an anchor 1, and the UPF entity serving as the PDU session anchor 2 may be described as an anchor 2. An interface between the anchor 1 and the DN is a first N6 interface, and an interface between the anchor 2 and the DN may be a second N6 interface. The SMF entity may insert the UL CL device into the network architecture after establishment of a PDU session or during establishment of a PDU session. The UL CL device may obtain a data flow characteristic from the SMF entity. For a data flow conforming to the data flow characteristic, the UL CL device routes the data flow to the DN by using the anchor 2 through the second N6 interface, for example, may route the data flow to the local network of the DN, and for a data flow not conforming to the data flow characteristic, the UL CL device may route the data flow to the DN by using the anchor 1 through the first N6 interface.

However, in the network architecture shown in FIG. 1, insertion of the UL CL device by the SMF entity is applicable to only a PDU session in the 3GPP access technology. When the terminal accesses the DN by using both the 3GPP access technology and the non-3GPP access technology, if the SMF entity determines to insert the UL CL device into an N3 interface between an access network device and the UPF entity, and the SMF does not know how to insert the UL CL device.

SUMMARY

Embodiments of this application provide a data transmission channel processing method, an apparatus, and a system, to resolve a problem of how to insert a UL CL device.

According to a first aspect, an embodiment of this application provides a data transmission channel processing method. The method includes determining, by a session management network element, that a data flow of a packet data unit PDU session of a terminal needs to be offloaded, where the PDU session is established by using a 3rd generation partnership project 3GPP access technology and a non-3GPP access technology, and determining, by the session management network element, to insert an offloading device into a data path of the PDU session, where the data path of the PDU session includes a data transmission channel in the 3GPP access technology and/or a data transmission channel in the non-3GPP access technology.

The determining, by a session management network element, that a data flow of a PDU session of a terminal needs to be offloaded may be sending the data flow of the PDU session to a data network through a second N6 interface, for example, this may be implemented by a UPF having a function of a UL CL.

In a possible design, the determining, by a session management network element, that a data flow of a PDU session of a terminal needs to be offloaded may be sending the data flow of the PDU session to a data network through an N9 interface and a second N6 interface, where the N9 interface is an interface between the offloading device and a session anchor device, and the N6 interface is an interface between the session anchor device and the data network.

According to the solution in this embodiment of this application, the data flow can be effectively processed, and the offloading device is inserted into a corresponding data flow transmission channel, thereby reducing redundant processing processes that are possibly caused by insertion of the offloading device.

In a possible design, the session management network element may determine, based on connection management states of the terminal in the 3GPP access technology and the non-3GPP access technology, to insert the offloading device into the data path of the PDU session.

In a possible design, the session management network element obtains connection management states of the terminal in the 3GPP access technology and the non-3GPP access technology from an access and mobility management network element.

In a possible implementation, if the terminal is in a connected state in the 3GPP access technology and is in an idle state in the non-3GPP access technology, the session management network element determines to insert the offloading device into the data transmission channel in the 3GPP access technology.

In another possible implementation, if the terminal is in an idle state in the 3GPP access technology and is in a connected state in the non-3GPP access technology, the session management network element determines to insert the offloading device into the data transmission channel in the non-3GPP access technology.

In still another possible implementation, if the terminal is in a connected state in both the 3GPP access technology and the non-3GPP access technology, the session management network element determines to insert the offloading device into both the data transmission channel in the 3GPP access technology and the data transmission channel in the non-3GPP access technology.

In another possible design, the session management network element may determine, based on characteristic information of the data flow of the PDU session, to insert the offloading device into the data path of the PDU session.

In a possible implementation, the characteristic information of the data flow includes an access technology type. If the access technology type is the 3GPP access technology, the session management network element determines to insert the offloading device into the data transmission channel in the 3GPP access technology, or if the access technology type is the non-3GPP access technology, the session management network element determines to insert the offloading device into the data transmission channel in the non-3GPP access technology, or if the access technology type includes the 3GPP access technology and the non-3GPP access technology, the session management network element determines to insert the offloading device into both the data transmission channel in the 3GPP access technology and the data transmission channel in the non-3GPP access technology.

In another possible implementation, the characteristic information of the data flow includes an access technology type, and the session management network element determines to insert the offloading device into both the data transmission channel in the 3GPP access technology and the data transmission channel in the non-3GPP access technology.

In a possible design, the session management network element may further notify the terminal of a transmission policy of the data flow of the PDU session by using the access and mobility management network element, where the transmission policy includes information about the data flow and the access technology type. Specifically, the access and mobility management network element receives the transmission policy of the data flow of the PDU session of the terminal from the session management network element, and sends the transmission policy of the data flow to the terminal.

In a possible design, the session management network element may further send indication information to the access and mobility management network element. The indication information is used by the access and mobility management network element to send a message to an access network device corresponding to the indication information, the message is used to establish a data transmission channel between the access network device and the offloading device, and the indication information includes information about the 3GPP access technology and/or information about the non-3GPP access technology. For example, the information about the 3GPP access technology may be an identifier of the 3GPP access technology, and the information about the non-3GPP access technology may be an identifier of the non-3GPP access technology. Correspondingly, after receiving the indication information, the access and mobility management network element may send the message to the access network device corresponding to the indication information, where the message is used to establish the data channel between the access network device and the offloading device.

In a possible design, the PDU session includes a target PDU session, and after the session management network element determines that the data flow of the PDU session of the terminal needs to be offloaded, the session management network element may further determine the target PDU session. Correspondingly, the session management network element may determine to insert the offloading device into a data path of the target PDU session.

In this design, the session management network element may further notify the terminal of a transmission policy of a data flow of the target PDU session by using the access and mobility management network element, where the transmission policy includes information about the data flow and information about the target PDU session.

In a possible design, the terminal is in an idle state in the 3GPP access technology and is in a connected state in the non-3GPP access technology, the session management network element determines to insert the offloading device into the data transmission channel in the 3GPP access technology, and the method may further include sending, by the session management network element, information about the 3GPP access technology to the access and mobility management network element, where the information about the 3GPP access technology is used by the access and mobility management network element to notify the terminal to initiate a service request process in the 3GPP access technology.

In a possible design, the session management network element sends a data routing rule to the offloading device.

The data routing rule may be used by the offloading device to route a downlink data packet. Specifically, the offloading device determines, based on characteristic information of the data packet and a corresponding routing policy, to send the data packet to the terminal device through a 3GPP access network device or to the terminal device through a non-3GPP side access network device.

In a possible design, the session management network element determines, based on a state of the data transmission channel in the 3GPP access technology and/or a state of the data transmission channel in the non-3GPP access technology, to insert the offloading device into the data path of the PDU session.

In a possible design, the state of the data transmission channel in the 3GPP access technology includes a user plane active state or a user plane inactive state, and the state of the data transmission channel in the non-3GPP access technology includes a user plane active state or a user plane inactive state.

In a possible design, the determining, by the session management network element based on a state of the data transmission channel in the 3GPP access technology and/or a state of the data transmission channel in the non-3GPP access technology, to insert the offloading device into the data path of the PDU session includes if the state of the data transmission channel in the 3GPP access technology is the user plane inactive state, determining, by the session management network element, to insert the offloading device into the data transmission channel in the non-3GPP access technology, or if the state of the data transmission channel in the non-3GPP access technology is the user plane inactive state, determining, by the session management network element, to insert the offloading device into the data transmission channel in the 3GPP access technology.

In a possible design, the session management network element sends indication information to the access and mobility management network element, where the indication information is used to instruct the access and mobility management network element to send user plane information of the offloading device to a non-3GPP access network side device, or the session management network element sends indication information to the access and mobility management network element, where the indication information is used to instruct the access and mobility management network element to send user plane information of the offloading device to a 3GPP access network side device.

In a possible design, the session management network element determines that the PDU session is a multi-access PDU session.

In a possible design, the determining, by the session management network element, to insert an offloading device into a data path of the PDU session includes determining, by the session management network element, to insert the offloading device into both the data transmission channel in the 3GPP access technology and the data transmission channel in the non-3GPP access technology.

In a possible design, the session management network element sends indication information to the access and mobility management network element, where the indication information is used by the access and mobility management network element to determine, based on connection management states of the terminal in the 3GPP access technology and the non-3GPP access technology, to insert the offloading device into the data path of the PDU session.

According to a second aspect, an embodiment of this application provides another data transmission channel processing method. The method includes determining, by an access and mobility management network element, that a connection management state of a terminal in a 3GPP access technology is an idle state and a connection management state of the terminal in a non-3GPP access technology is a connected state, and sending, by the access and mobility management network element, a notification message to the terminal by using the non-3GPP access technology, where the notification message is used to notify the terminal to initiate a service request process in the 3GPP access technology.

According to the solution in this embodiment of this application, redundant signaling operations that are caused by insertion of an offloading device for a PDU session in an idle state can be reduced.

In a possible design, the access and mobility management network element may further start a timer, and if the timer expires and the access and mobility management network element does not receive a service request message of the terminal, the access and mobility management network element sends a paging message to the terminal by using the 3GPP access technology. Optionally, duration of the timer may be determined based on quality of service information of a downlink data packet for the terminal.

In a possible design, before determining that the connection management state of the terminal in the 3GPP access technology is the idle state and the connection management state of the terminal in the non-3GPP access technology is the connected state, the access and mobility management network element may further receive information about the 3GPP access technology from a session management network element.

In this design, before sending the information about the 3GPP access technology to the access and mobility management network element, the session management network element may further determine that a data flow of a PDU session of the terminal needs to be offloaded, where the PDU session is established by using the 3GPP access technology and the non-3GPP access technology, and determine to insert an offloading device into a data path of the PDU session, where the data path of the PDU session includes a data transmission channel in the 3GPP access technology.

According to a third aspect, an embodiment of this application provides a data transmission channel processing manner, including receiving, by an access and mobility management network element, indication information sent by a session management network element, and sending, by the access and mobility management network element, user plane information of an offloading device to a non-3GPP access network side device and/or a 3GPP access network side device based on the indication information.

In a first possible implementation of the third aspect, the access and mobility management network element determines a connection management state of a terminal in a 3GPP access technology and/or a connection management state of the terminal in a non-3GPP access technology, and the sending, by the access and mobility management network element, user plane information of an offloading device to a non-3GPP access network side device and/or a 3GPP access network side device based on the indication information includes sending, by the access and mobility management network element, the user plane information of the offloading device to the non-3GPP access network side device and/or the 3GPP access network side device based on the indication information and the connection management state of the terminal in the 3GPP access technology and/or the connection management state of the terminal in the non-3GPP access technology.

In a second possible implementation of the third aspect, the indication information includes information about the 3GPP access technology and/or information about the non-3GPP access technology, and the sending, by the access and mobility management network element, user plane information of an offloading device to a non-3GPP access network side device and/or a 3GPP access network side device based on the indication information includes sending, by the access and mobility management network element, the user plane information of the offloading device to the non-3GPP access network side device and/or the 3GPP access network side device corresponding to the indication information.

In a third possible implementation of the third aspect, the indication information includes information about the 3GPP access technology and information about the non-3GPP access technology, and the sending, by the access and mobility management network element, the user plane information of the offloading device to the non-3GPP access network side device and/or the 3GPP access network side device based on the indication information and the connection management state of the terminal in the 3GPP access technology and/or the connection management state of the terminal in the non-3GPP access technology includes if the connection management state of the terminal in the 3GPP access technology is an idle state, sending, by the access and mobility management network element, the user plane information of the offloading device to the non-3GPP access network side device, where the user plane information of the offloading device is used to establish a data transmission channel between the non-3GPP access network side device and the offloading device.

In a fourth possible implementation of the third aspect, the indication information includes information about the 3GPP access technology and information about the non-3GPP access technology, and the sending, by the access and mobility management network element, the user plane information of the offloading device to the non-3GPP access network side device and/or the 3GPP access network side device based on the indication information and the connection management state of the terminal in the 3GPP access technology and/or the connection management state of the terminal in the non-3GPP access technology includes if the connection management state of the terminal in the non-3GPP access technology is an idle state, sending, by the access and mobility management network element, the user plane information of the offloading device to the 3GPP access network side device, where the user plane information of the offloading device is used to establish a data transmission channel between the 3GPP access network side device and the offloading device.

According to a fourth aspect, an embodiment of this application provides an apparatus. The apparatus has a function of implementing an action of the session management network element according to the first aspect. The function may be implemented by hardware, or may be implemented by hardware executing corresponding software. The hardware or the software includes one or more modules corresponding to the foregoing function. For example, the apparatus may be a session management network element or a chip in a session management network element.

In a possible design, the apparatus is a session management network element, and the session management network element includes a processor. The processor is configured to support the session management network element in performing a corresponding function in the method according to the first aspect. Further, the session management network element may include a communications interface, and the communications interface is configured to support communication between the session management network element and an access and mobility management network element or another network element. Further, the session management network element may include a memory, and the memory is configured to couple to the processor, and stores a program instruction and data that are necessary for the session management network element.

According to a fifth aspect, an embodiment of this application provides an apparatus. The apparatus has a function of implementing an action of the access and mobility management network element in the methods according to the second aspect and the third aspect. The function may be implemented by hardware, or may be implemented by hardware executing corresponding software. The hardware or the software includes one or more modules corresponding to the foregoing function. For example, the apparatus may be an access and mobility management network element or a chip in an access and mobility management network element.

In a possible design, the apparatus is an access and mobility management network element, and the access and mobility management network element includes a processor. The processor is configured to support the access and mobility management network element in performing a corresponding function in the foregoing method. Further, the access and mobility management network element may include a communications interface, and the communications interface is configured to support communication between the access and mobility management network element and a session management network element or another network element. Further, the access and mobility management network element may include a memory, and the memory is configured to couple to the processor, and stores a program instruction and data necessary that are for the access and mobility management network element.

According to a sixth aspect, an embodiment of this application provides a communications system. The system includes the session management network element and the access and mobility management network element according to the foregoing aspects.

According to a seventh aspect, an embodiment of this application provides a computer storage medium, configured to store a computer software instruction used by the session management network element, and the computer storage medium includes a program designed to perform the first aspect.

According to an eighth aspect, an embodiment of this application provides a computer storage medium, configured to store a computer software instruction used by the access and mobility management network elements according to the second aspect and the third aspect, and the computer storage medium includes a program designed to perform the foregoing aspects.

According to a ninth aspect, an embodiment of this application provides a computer program product including an instruction, and when the instruction is run on a computer, the computer is enabled to perform the method according to the first aspect.

According to a tenth aspect, an embodiment of this application provides a computer program product including an instruction, and when the instruction is run on a computer, the computer is enabled to perform the methods according to the second aspect and the third aspect.

According to an eleventh aspect, an embodiment of this application provides a chip system applied to a session management network element. The chip system includes at least one processor, a memory, and an interface circuit. The memory, the transceiver, and the at least one processor are connected to each other through lines. The at least one memory stores an instruction, and the instruction is executed by the processor, to perform an operation of the session management network element in the method according to the first aspect or the second aspect.

According to a twelfth aspect, an embodiment of this application provides a chip system applied to an access and mobility management network element. The chip system includes at least one processor, a memory, and an interface circuit. The memory, the transceiver, and the at least one processor are connected to each other through lines. The at least one memory stores an instruction, and the instruction is executed by the processor, to perform an operation of the access and mobility management network element in the method according to the first aspect or the second aspect or the third aspect.

Compared with the prior art, in the solutions in the embodiments of this application, after determining that the data flow of the PDU session of the terminal needs to be offloaded, the session management network element can determine to insert the offloading device into the data transmission channel in the 3GPP access technology and/or the data transmission channel in the non-3GPP access technology, so that the data flow can be effectively processed, thereby reducing redundant processing processes that are possibly caused by insertion of the offloading device.

DETAILED DESCRIPTION OF ILLUSTRATIVE EMBODIMENTS

The following describes the technical solutions in the embodiments of this application with reference to the accompanying drawings in the embodiments of this application.

Network architectures and application scenarios described in the embodiments of this application are intended to describe the technical solutions in the embodiments of this application more clearly, and constitute no limitation on the technical solutions provided in the embodiments of this application. A person of ordinary skill in the art may learn that with evolution of a network architecture and emergence of a new application scenario, the technical solutions provided in the embodiments of this application are also applicable to similar technical problems.

A network architecture to which the embodiments of this application are applicable is first described below with reference to FIG. 2A.

Figure 1:
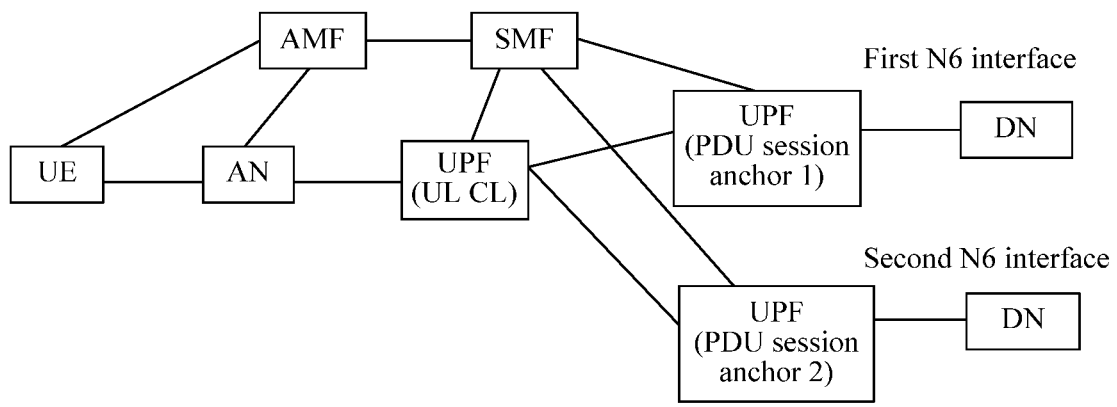
FIG. 1 is a schematic diagram of a network architecture when a terminal accesses a DN by using a 3GPP access technology.
Figure 2A:
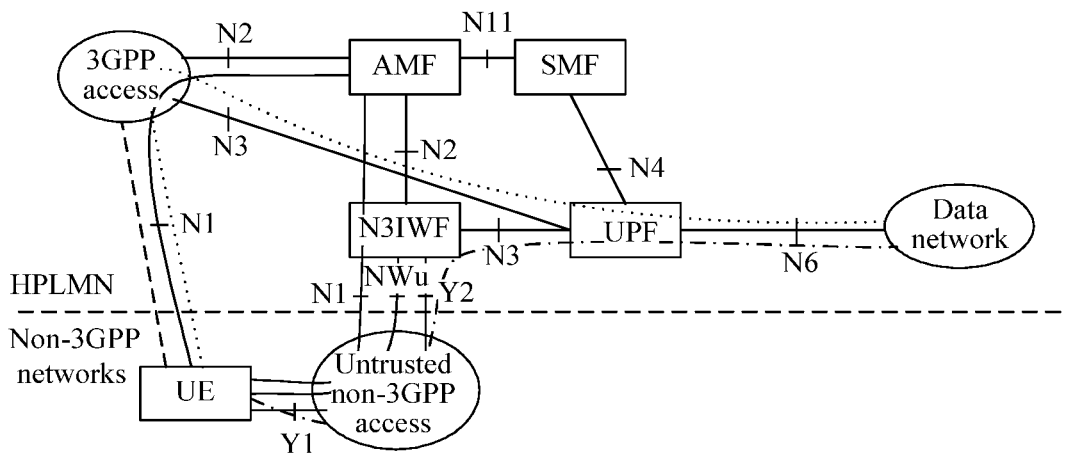
FIG. 2A is a schematic diagram of a possible network architecture according to an embodiment of this application.

FIG. 2A is a schematic diagram of a possible network architecture according to an embodiment of this application. The network architecture shown in FIG. 2A includes user equipment (UE), a 3GPP access network (represented by 3GPP Access in FIG. 2A), a non-3GPP access network (represented by Untrusted Non-3GPP Access in FIG. 2A), a non-3GPP interworking function (N3IWF) entity, an access and mobility management function (AMF) entity, a session management function (SMF) entity, a user plane function (UPF) entity, and a data network (DN). There is an N1 interface between the UE and the AMF entity, there is a Y1 interface between the UE and the non-3GPP access network, there is an NWu interface between the UE and the N3IWF entity, there is an N2 interface between the 3GPP access network and the AMF entity, there is an N3 interface between the 3GPP access network and the UPF entity, there is a Y2 interface between the non-3GPP access network and the N3IWF entity, there is an N3 interface between the N3IWF entity and the UPF entity, there is an N2 interface between the N3IWF entity and the AMF entity, there is an $N_{11}$ interface between the AMF entity and the SMF entity, there is an N4 interface between the SMF entity and the UPF entity, and there is an N6 interface between the UPF entity and the DN. The UE may access the DN by using the 3GPP access network, or may access the DN by using the non-3GPP access network, or may access the DN by using both the 3GPP access network and the non-3GPP access network.

For ease of description, an entity may be represented by its English abbreviation below, for example, the AMF entity may be indicated by an AMF, and another entity is similar to this. Details are not described again subsequently.

In the embodiments of this application, a 3GPP access network side device may be a base station device, and a non-3GPP access network side device may be an access point and/or a gateway device (for example, an N3IWF).

In the embodiments of this application, nouns "network" and "system" are usually interchangeably used, but meanings of the nouns may be understood by a person skilled in the art. A terminal in the embodiments of this application may include various handheld devices, in-vehicle devices, wearable devices, or computing devices that have a wireless communication function, or another processing device connected to a wireless modem, and user equipment (UE), a mobile station (MS), a terminal device, and the like in various forms. For ease of description, the devices mentioned above are collectively referred to as the terminal.

"/" in the embodiments of this application describes only an association relationship for describing associated objects and represents that three relationships may exist. For example, A/B may represent the following cases: Only A exists, both A and B exist, and only B exists. In addition, in the descriptions of this application, "a plurality of" means two or more than two.

In the embodiments of this application, that a network element (for example, a network element A) obtains information from another network element (for example, a network element B) may mean that the network element A directly receives the information from the network element B, or may mean that the network element A receives the information from the network element B by using another network element (for example, a network element C). When the network element A receives the information from the network element B by using the network element C, the network element C may transparently transmit the information, or may process the information, for example, add the information to different messages for transmission, or screen the information, and send only information obtained through screening to the network element A. Similarly, in various embodiments of this application, that the network element A sends information to the network element B may mean that the network element A directly sends the information to the network element B, or may mean that the network element A sends the information to the network element B by using another network element (for example, the network element C).

The embodiments of this application are further described below in detail based on the foregoing common aspects in the embodiments of this application. In network architectures shown in FIG. 2A to FIG. 2D, a terminal is illustrated as UE.

In the network architecture shown in FIG. 2A, when the terminal accesses the DN by using both a 3GPP access technology and a non-3GPP access technology, a same PDU session may be established by using the two access technologies. In FIG. 2A, a dot line indicates a transmission path of a data flow passing through the 3GPP access network, and a dash dot line indicates a transmission path of a data flow through passing the non-3GPP access network. Connections established by the terminal to the DN by using the two access technologies belong to a same PDU session, that is, data transmission indicated by the dot line and data transmission indicated by the dash dot line belong to a same PDU session.

When the terminal accesses the data network by using one access technology, during or after establishment of a PDU session, if the SMF considers, based on information such as a location of the terminal and a characteristic of a data flow, that offloading processing on the data flow of the PDU session can be supported, so that the SMF may select a UPF for the PDU session, and insert the UPF into a data path of the PDU session, and a core network establishes a second N6 interface to the data network, to send the data flow to the data network through the second N6 interface. In the process, the UPF selected by the SMF may include a UL CL and/or a PDU session anchor (PSA) function device. The offloading processing on the data flow may indicate traffic offloading processing.

However, when the terminal accesses the DN by using both the 3GPP access technology and the non-3GPP access technology and establishes a same PDU session by using two the access technologies, the PDU session includes two data transmission channels. One is a data transmission channel between the 3GPP access network and the UPF, and the other is a data transmission channel between the N3GPP access network and the UPF. Therefore, when determining to offload a data flow, the SMF needs to determine a data transmission channel on which the data flow is to be offloaded to the second N6 interface to arrive at the data network, that is, needs to determine an N3 interface into which the UPF is to be inserted.

In view of this, according to the solutions provided in the embodiments of this application, it is determined to insert an offloading device into the data transmission channel in the 3GPP access technology or the data transmission channel in the non-3GPP access technology, or insert an offloading device into both the data transmission channel in the 3GPP access technology and the data transmission channel in the non-3GPP access technology. In a possible implementation, insertion of the offloading device into the data transmission channel in the 3GPP access technology may be understood as insertion of the offloading device into an N3 interface in the 3GPP access technology, and insertion of the offloading device into the data transmission channel in the non-3GPP access technology may be understood as insertion of the offloading device into an N3 interface in the non-3GPP access technology. It should be noted that, selection of the N3 interface is determining of a data flow transmission channel of a data flow to be offloaded. For ease of description, in this application, selection of an N3 interface into which an offloading device is to be inserted is described.

The offloading device is a device that offloads data packets received from an access network into at least two N6 interfaces and transmits the data packets to the data network. Devices through which a data flow is offloaded into different data transmission channels may all be referred to as offloading devices. For example, the offloading device may be an uplink classifier, or may be a branching point, or may be an offloading device in another form, or the offloading device may be a UPF having a function of an uplink classifier or a branching point. In the embodiments of this application, the PDU session anchor device may be a UPF network element, for example, a UPF 1 and a UPF 2 in FIG. 2B.

FIG. 2B to FIG. 2F are respectively schematic diagrams of different insertion cases. Brief descriptions are separately provided below. For clarity, in FIG. 2B to FIG. 2F, parts the same as or similar to those in FIG. 2A are not shown, and reference may be made to the detailed descriptions of FIG. 2A. Details are not described herein again.

Figure 2B:
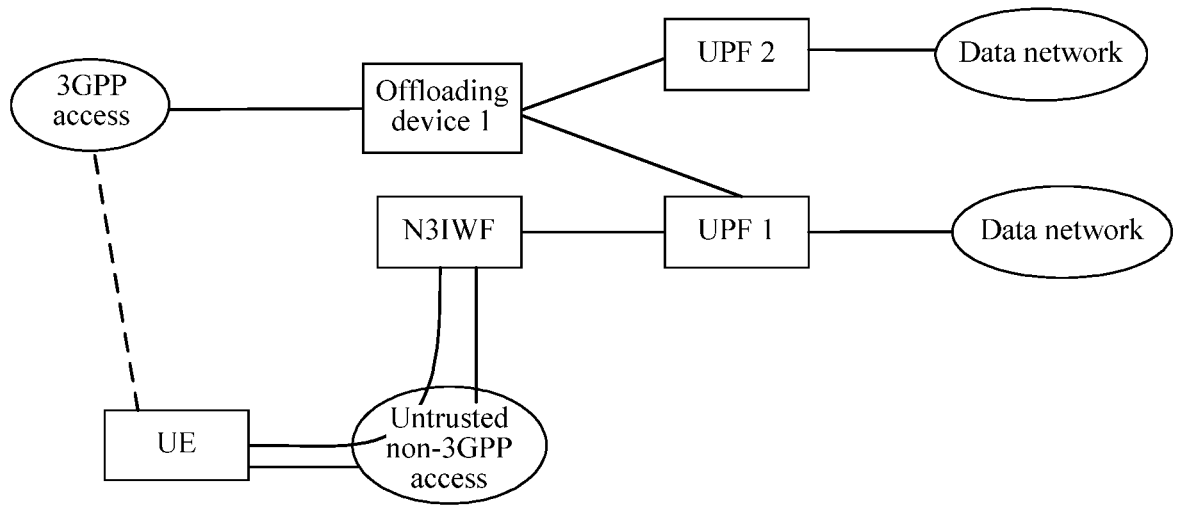
FIG. 2B is a schematic diagram of another possible network architecture according to an embodiment of this application.

FIG. 2B is a schematic diagram of insertion of an offloading device into a data transmission channel in a 3GPP access technology. As shown in FIG. 2B, an offloading device 1 is inserted into an N3 interface in the 3GPP access technology. Specifically, the offloading device 1 is inserted between a 3GPP access network and the UPF 1. After the offloading device 1 is inserted, a data transmission channel is established between the offloading device 1 and the UPF 2. Therefore, a data flow conforming to a data flow characteristic 1 may be routed to a DN by using the UPF 2 after passing through the offloading device 1. During actual implementation, the offloading device 1 shown in FIG. 2B may be disposed as an independent network element, or may be disposed in one network element with the UPF 1 and the UPF 2, or may be disposed in another manner. This is not limited in this embodiment of this application.

Figure 2C:
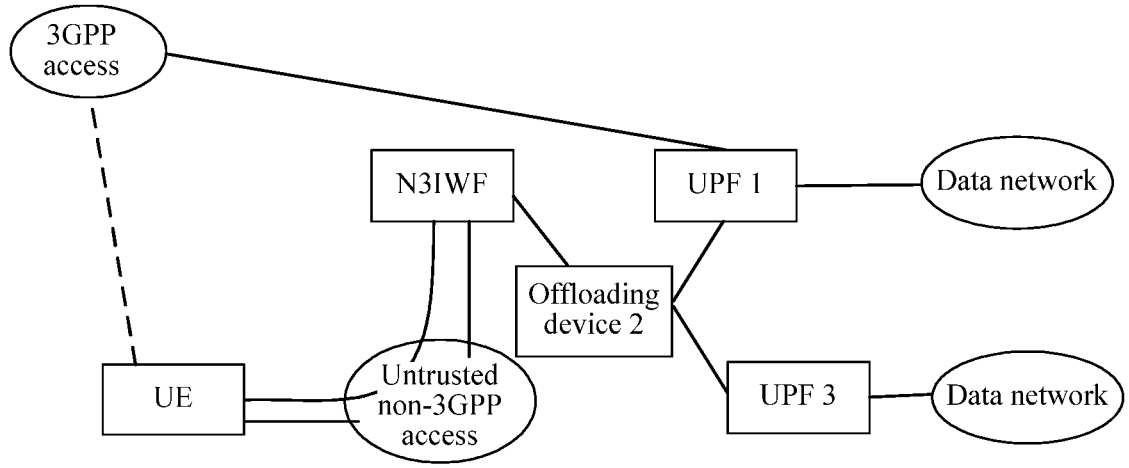
FIG. 2C is a schematic diagram of still another possible network architecture according to an embodiment of this application.

FIG. 2C is a schematic diagram of insertion of an offloading device into a data transmission channel in a non-3GPP access technology. As shown in FIG. 2C, an offloading device 2 is inserted into an N3 interface in the non-3GPP access technology. Specifically, the offloading device 2 is inserted between a non-3GPP access network and a UPF 1. After the offloading device 2 is inserted, a data transmission channel is established between the offloading device 2 and a UPF 3. Therefore, a data flow conforming to a data flow characteristic 2 may be routed to a DN by using the UPF 3 after passing through the offloading device 2. During actual implementation, the offloading device 2 shown in FIG. 2C may be disposed as an independent network element, or may be disposed in one network element with the UPF 1 and the UPF 3, or may be disposed in another manner. This is not limited in this embodiment of this application.

Figure 2D:
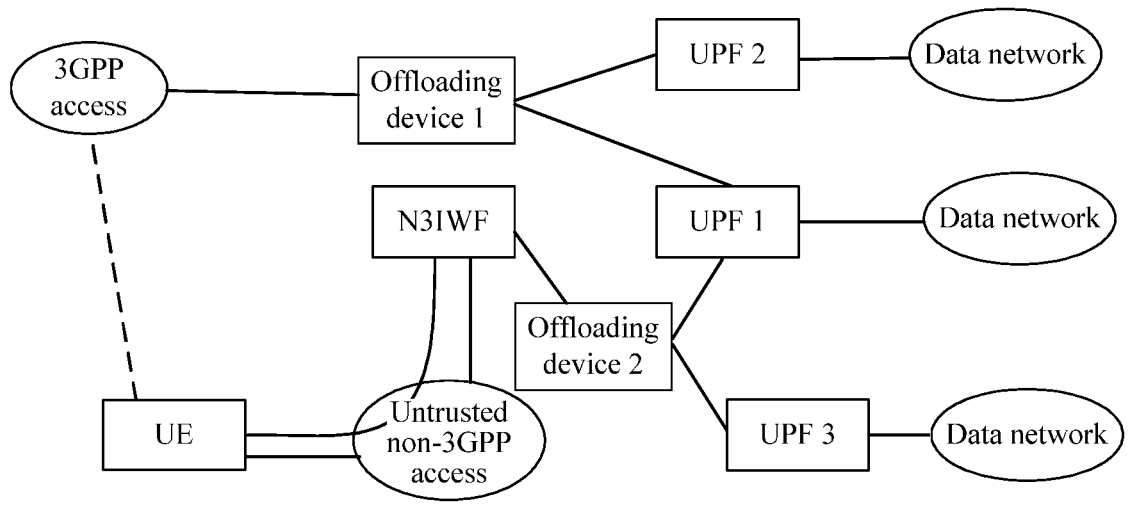
FIG. 2D is a schematic diagram of yet another possible network architecture according to an embodiment of this application.

FIG. 2D is a schematic diagram of insertion of an offloading device into both a data transmission channel in a 3GPP access technology and a data transmission channel in a non-3GPP access technology. As shown in FIG. 2D, an offloading device 1 is inserted into an N3 interface in the 3GPP access technology. Specifically, the offloading device 1 is inserted between a 3GPP access network and a UPF 1. After the offloading device 1 is inserted, a data transmission channel is established between the offloading device 1 and a UPF 2. An offloading device 2 is inserted into an N3 interface in the non-3GPP access technology. Specifically, the offloading device 2 is inserted between a non-3GPP access network and the UPF 1. After the offloading device 2 is inserted, a data transmission channel is established between the offloading device 2 and a UPF 3. Therefore, if a data flow transmitted by using the 3GPP access technology conforms to a data flow characteristic 1, the data flow may be routed to a DN by using the UPF 2 after passing through the offloading device 1, and if a data flow transmitted by using the non-3GPP access technology conforms to a data flow characteristic 2, the data flow may be routed to the DN by using the UPF 3 after passing through the offloading device 2. During actual implementation, for a manner of disposing the offloading device 1 in FIG. 2D, refer to the manner of disposing the offloading device 1 in FIG. 2B. For a manner of disposing the offloading device 2 in FIG. 2D, refer to the manner of disposing the offloading device 2 in FIG. 2C. Details are not described herein again.

Figure 2E:
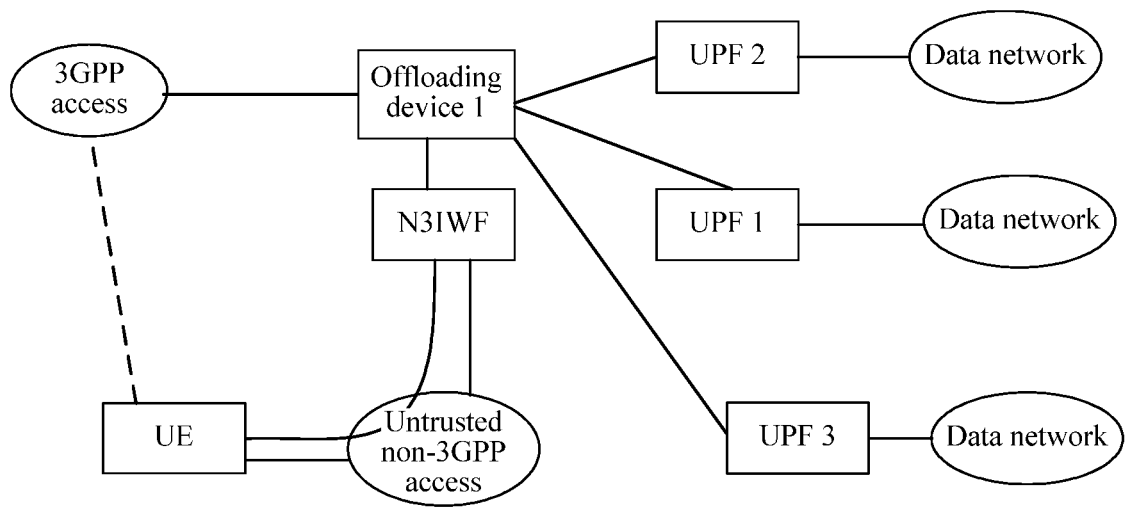
FIG. 2E is a schematic diagram of yet another possible network architecture according to an embodiment of this application.

FIG. 2E is a schematic diagram of insertion of an offloading device into both a data transmission channel in a 3GPP access technology and a data transmission channel in a non-3GPP access technology. As shown in FIG. 2E, offloading devices inserted into the data transmission channel in the 3GPP access technology and the data transmission channel in the non-3GPP access technology are a same offloading device 1, and a UPF 2 and a UPF 3 are different network elements. A data transmission channel is established between the offloading device 1 and to each of the UPF 2 and the UPF 3. If a data flow transmitted by using the 3GPP access technology conforms to a data flow characteristic 1, the data flow may be routed to a DN by using the UPF 2 after passing through the offloading device 1, and if a data flow transmitted by using the non-3GPP access technology conforms to a data flow characteristic 2, the data flow may be routed to the DN by using the UPF 3 after passing through the offloading device 1. For specific disposition of the offloading device 1, refer to descriptions of FIG. 2B and FIG. 2D. For disposition of the offloading device 1, also refer to descriptions of a fourth example in step 302.

Figure 2F:
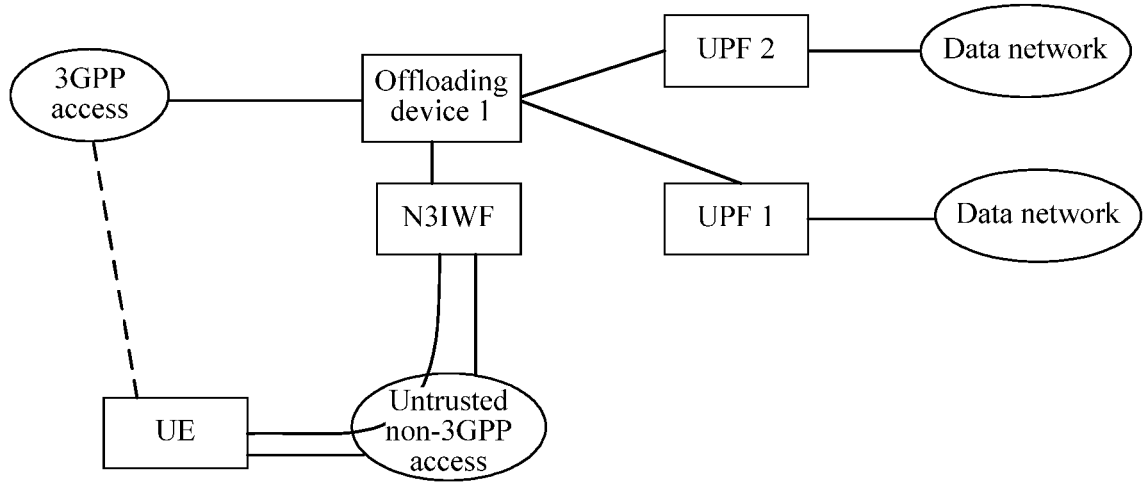
FIG. 2F is a schematic diagram of yet another possible network architecture according to an embodiment of this application.

FIG. 2F is a schematic diagram of insertion of an offloading device into both a data transmission channel in a 3GPP access technology and a data transmission channel in a non-3GPP access technology. As shown in FIG. 2F, offloading devices inserted into the data transmission channel in the 3GPP access technology and the data transmission channel in the non-3GPP access technology are a same offloading device 1, and a UPF 2 and a UPF 3 are a same UPF (for example, the UPF 2). A data transmission channel is established between the offloading device 1 and the UPF 2. Data flows offloaded from a data flow transmitted by using the 3GPP access technology and a data flow transmitted by using the non-3GPP access technology are routed to a DN by using the offloading device 1 and the UPF 2. For disposition of the offloading device 1, also refer to descriptions of a fourth example in step 302.

It should be noted that FIG. 2B to FIG. 2F show at least two DNs. During actual implementation, the at least two DNs may be one data network and a local network of the data network, or the at least two DNs may be replaced by one DN.

Based on the foregoing application scenarios, the embodiments of this application provide a data transmission channel processing method, and a session management network element, an access and mobility management network element, a user plane network element, a terminal, and a system that are based on the method. The method includes determining, by a session management network element, that a data flow of a PDU session of a terminal needs to be offloaded, where the PDU session is established by using a 3GPP access technology and a non-3GPP access technology, and determining, by the session management network element, to insert an offloading device into a data path of the PDU session, where the data path of the PDU session includes a data transmission channel in the 3GPP access technology and/or a data transmission channel in the non-3GPP access technology.

According to the solutions in the embodiments of this application, the data flow can be effectively processed, and the offloading device is inserted into a corresponding data flow transmission channel, thereby reducing redundant processing processes that are possibly caused by insertion of the offloading device.

The processing method is described below with reference to FIG. 3. A method shown in FIG. 3 includes step 301 and step 302. Optionally, the method shown in FIG. 3 may further include step 303 and step 304.

Step 301: A session management network element determines that a data flow of a PDU session of a terminal needs to be offloaded, where the PDU session is established by using a 3GPP access technology and a non-3GPP access technology.

That the session management network element determines that the data flow of the PDU session of the terminal needs to be offloaded may be understood as that the session management network element determines to offload a data flow on a data transmission channel in the PDU session (traffic offloading). In this case, the session management network element may control a data path of the PDU session, so that the PDU session may correspond to at least two N6 interfaces.

In an example, the session management network element may determine, based on a location of the terminal, that the data flow of the PDU session needs to be offloaded. For example, the session management network element may perceive, based on the location of the terminal, that the data flow of the PDU session of the terminal can be offloaded to a local network of a data network.

In another example, the session management network element may determine, based on application information of a service of the terminal, that the data flow of the PDU session needs to be offloaded. For example, the session management network element determines, based on a data flow characteristic of an application of a service that is currently transmitted by the terminal, that the data flow of the PDU session of the terminal can be offloaded by using an offloading device.

In this part, the PDU session of the terminal may include at least two PDU sessions, and the PDU session of the terminal may include a target PDU session. After determining that the data flow of the PDU session of the terminal needs to be offloaded, the session management network element may further determine the target PDU session.

Step 302: The session management network element determines to insert an offloading device into a data transmission channel in the PDU session, where the data path of the PDU session includes a data transmission channel in the 3GPP access technology and/or a data transmission channel in the non-3GPP access technology.

The session management network element may determine, based on connection management states of the terminal in the 3GPP access technology and the non-3GPP access technology, characteristic information of the data flow of the PDU session, or another factor, to insert the offloading device into the data path of the PDU session.

In a first example, the session management network element may determine, based on the connection management states of the terminal in the 3GPP access technology and the non-3GPP access technology, to insert the offloading device into the data path of the PDU session.

In a possible implementation, if the terminal is in a connected state in the 3GPP access technology and is in an idle state in the non-3GPP access technology, the session management network element determines to insert the offloading device into the data transmission channel in the 3GPP access technology.

In another possible implementation, if the terminal is in an idle state in the 3GPP access technology and is in a connected state in the non-3GPP access technology, the session management network element determines to insert the offloading device into the data transmission channel in the non-3GPP access technology.

In still another possible implementation, if the terminal is in a connected state in both the 3GPP access technology and the non-3GPP access technology, the session management network element determines to insert the offloading device into both the data transmission channel in the 3GPP access technology and the data transmission channel in the non-3GPP access technology.

In this example, before the session management network element determines to insert the offloading device into the data path of the PDU session, the session management network element may further receive the connection management states of the terminal in the 3GPP access technology and the non-3GPP access technology from an access and mobility management network element. Optionally, before receiving the connection management states of the terminal in the 3GPP access technology and the non-3GPP access technology, the session management network element may further request the connection management states of the terminal in the 3GPP access technology and the non-3GPP access technology from the access and mobility management network element.

In a second example, the session management network element may determine, based on the characteristic information of the data flow of the PDU session, to insert the offloading device into the data path of the PDU session.

In a possible implementation, the characteristic information of the data flow includes an access technology type, and the session management network element may determine, based on the access technology type, to insert the offloading device into the data path of the PDU session. For example, if the access technology type is the 3GPP access technology, the session management network element determines to insert the offloading device into the data transmission channel in the 3GPP access technology, or if the access technology type is the non-3GPP access technology, the session management network element determines to insert the offloading device into the data transmission channel in the non-3GPP access technology, or if the access technology type includes the 3GPP access technology and the non-3GPP access technology, the session management network element determines to insert the offloading device into both the data transmission channel in the 3GPP access technology and the data transmission channel in the non-3GPP access technology.

In another possible implementation, the characteristic information of the data flow does not include an access technology type, and the session management network element determines to insert the offloading device into both the data transmission channel in the 3GPP access technology and the data transmission channel in the non-3GPP access technology.

In a third example, the session management network element determines, based on a state of the data transmission channel in the 3GPP access technology and/or a state of the data transmission channel in the non-3GPP access technology, to insert the offloading device into the data path of the PDU session.

The state of the data transmission channel in the 3GPP access technology includes a user plane active state or a user plane inactive state, and the state of the data transmission channel in the non-3GPP access technology includes a user plane active state or a user plane inactive state. In this embodiment of this application, the user plane inactive state means that a transmission resource for a data channel between an air interface part and an N3 part (for example, between an access network device and a gateway device) of the data transmission channel is released. Correspondingly, the user plane active state means that there is a transmission resource for the data channel between the air interface part and the N3 part (for example, between the access network device and the gateway device) of the data transmission channel.

In a possible implementation, the session management network element may determine the state of the data transmission channel in the 3GPP access technology and/or the state of the data transmission channel in the non-3GPP access technology based on a PDU session establishment procedure or a PDU session modification procedure or an AN release process. For example, after the access and mobility management network element releases a UE context of an N2 interface, the access and mobility management network element sends a session context update message (for example, an Nsmf_PDU Session_UpdateSMContext Request) to the session management network element, and the message includes an access technology type (non-3GPP access or 3GPP access). The session management network element releases a transmission resource for a data transmission channel of the access technology type based on the access type in the message, to determine that a state of the data transmission channel in the access technology is an inactive state. The session management network element may send a PDU session modification request of an N4 interface (for example, an N4 Session Modification Request) to a user plane function network element, and the request message includes the access technology type (non-3GPP access or 3GPP access). For another example, after a PDU session is established, the session management network element determines that a data transmission channel in the 3GPP access technology in the PDU session is in an active state and/or a data transmission channel in the non-3GPP access technology in the PDU session is in an active state.

In a possible implementation, if the state of the data transmission channel in the 3GPP access technology is the user plane inactive state, the session management network element determines to insert the offloading device into the data transmission channel in the non-3GPP access technology. Specifically, if the state of the data transmission channel in the 3GPP access technology is the user plane inactive state and the state of the data transmission channel in the non-3GPP access technology is the active state, the session management network element determines to insert the offloading device into the data transmission channel in the non-3GPP access technology. In this scenario, the session management network element sends indication information to the access and mobility management network element. The indication information may be information about the non-3GPP access technology, for example, a type of the non-3GPP access technology. The indication information is used to instruct the access and mobility management network element to send user plane information of the offloading device to a non-3GPP access network side device. For the indication information, specifically refer to descriptions of step 303. The session management network element may further send the user plane information of the offloading device to the access and mobility management network element. The user plane information of the offloading device may be core network tunnel information. The user plane information of the offloading device is used to establish a data transmission channel between the non-3GPP access network side device and the offloading device.

In a possible implementation, if the state of the data transmission channel in the non-3GPP access technology is the user plane inactive state, the session management network element determines to insert the offloading device into the data transmission channel in the 3GPP access technology. Specifically, if the state of the data transmission channel in the non-3GPP access technology is the user plane inactive state and the state of the data transmission channel in the 3GPP access technology is the active state, the session management network element determines to insert the offloading device into the data transmission channel in the 3GPP access technology. In this scenario, the session management network element sends indication information to the access and mobility management network element. The indication information may be information about the 3GPP access technology, for example, a type of the 3GPP access technology. The indication information is used to instruct the access and mobility management network element to send user plane information of the offloading device to a 3GPP access network side device. For the indication information, specifically refer to descriptions of step 303. The session management network element may further send the user plane information of the offloading device to the access and mobility management network element. The user plane information of the offloading device is used to establish a data transmission channel between the 3GPP access network side device and the offloading device.

In a possible implementation, if the state of the data transmission channel in the non-3GPP access technology is the user plane active state and the state of the data transmission channel in the 3GPP access technology is the user plane active state, the session management network element determines to insert the offloading device into both the data transmission channel in the 3GPP access technology and the data transmission channel in the non-3GPP access technology. In this scenario, the session management network element sends indication information to the access and mobility management network element. The indication information may be information about the 3GPP access technology and information about the non-3GPP access technology. The indication information is used to instruct the access and mobility management network element to send user plane information of the offloading device to a 3GPP access network side device and a non-3GPP access network side device. The user plane information of the offloading device is used to establish a data transmission channel between the 3GPP access network side device and the offloading device and a data transmission channel between the non-3GPP access network side device and the offloading device. It should be noted that when the indication information sent by the session management network element to the access and mobility management network element is the information about the 3GPP access technology and the information about the non-3GPP access technology, the indication information may be sent by using one message or may be sent by using two messages. For example, the session management network element sends the information about the 3GPP access technology to the access and mobility management network element by using one message, and the session management network element sends the information about the non-3GPP access technology to the access and mobility management network element by using the other message. The information about the 3GPP access technology may be a type of the 3GPP access technology, and the information about the non-3GPP access technology may be a type of the non-3GPP access technology.

In a fourth example, the session management network element determines that the PDU session is a multi-access PDU session (MA-PDU). The PDU session determines that the PDU session is established by using the 3GPP access technology and the non-3GPP access technology.

If the PDU session is a multi-access PDU session, the session management network element determines to insert the offloading device into both the data transmission channel in the 3GPP access technology and the data transmission channel in the non-3GPP access technology.

In a possible implementation, the session management network element determines, based on identifier information of the PDU session, whether the PDU session is a multi-access PDU session. For example, during establishment of the PDU session, the terminal sends MA-PDU indication information to a network side. The session management network element obtains the MA-PDU indication information by using the access and mobility management network element, and the session management network element determines that the PDU session is a multi-access PDU session. For another example, if during establishment of the PDU session, the PDU session includes a plurality of PDU session identifiers (for example, a PDU session 1/a PDU session 2), the session management network element determines that the PDU session is a multi-access PDU session.

It should be noted that the session management network element can learn, not only during establishment of the PDU session, that the PDU session is an MA-PDU session. In another possible implementation, after a data transmission channel (which is referred to as a first data transmission channel in this application for convenience) on a 3GPP side or a non-3GPP side is completely established, during establishment of another data transmission channel (which is referred to as a second data transmission channel in this specification for convenience) (on the non-3GPP side or the 3GPP side), it is learned that the PDU session is an MA-PDU session. In this case, if an offloading device is already selected during establishment of the first data transmission channel and one or more N9 interfaces (the N9 interface is an interface between the offloading device and a session anchor device, for example, an interface between the offloading device 1 and the UPF 2 in FIG. 2B) are established, and if during establishment of the second data transmission channel, the session management network element learns that the PDU session is an MA-PDU session, the session management network element selects a corresponding offloading device for the second data transmission channel, and establishes one or more N9 interfaces for the second data transmission channel. The session anchor device is the same as a session anchor device selected during establishment of the first data transmission channel. Alternatively, if no offloading device is selected during establishment of the first data transmission channel, and if during establishment of the second data transmission channel, the session management network element learns that the PDU session is an MA-PDU session, during establishment of the second data transmission channel, the session management network element selects an offloading device according to a UPF selection principle, and establishes one or more N9 interfaces for the second data transmission channel. After the second data transmission channel is completely established, the session management network element may initiate a route update process based on the first data transmission channel, insert the offloading device selected during establishment of the second data transmission channel into the first data transmission channel, and establish an N9 interface to a same gateway device as that on the first data transmission channel.

In a possible implementation, the session management network element sends indication information to the access and mobility management network element. The indication information may be information about the 3GPP access technology and information about the non-3GPP access technology. The indication information is used by the access and mobility management network element to send user plane information of the offloading device to an access network device corresponding to the indication information. The access network device establishes a data transmission channel between the access network device and the offloading device based on the user plane information of the offloading device. The indication information may be included in one message and sent to the access and mobility management network element, or the indication information may be sent to the access and mobility management network element by using two messages.

After receiving the indication information, the access and mobility management network element determines, based on the connection management states of the terminal in the 3GPP access technology and the non-3GPP access technology, to insert the offloading device into the data path of the PDU session. For a manner in which the access and mobility management network element determines, based on the connection management states of the terminal in the 3GPP access technology and the non-3GPP access technology, to insert the offloading device into the data path of the PDU session, specifically refer to the method for determining, by the session management network element, to insert the offloading device in the first example. In this scenario, although the session management network element determines to insert the offloading device into both the data transmission channel in the 3GPP access technology and the data transmission channel in the non-3GPP access technology, the access and mobility management network element may determine, based on the connection management states of the terminal in the 3GPP access technology and the non-3GPP access technology, to insert the offloading device into the data path of the PDU session.

In the foregoing examples and the possible implementations thereof, the offloading device may be inserted into the data transmission channel in the 3GPP access technology in the following manner. The offloading device is inserted into an N3 interface in the 3GPP access technology. The offloading device may be inserted into the data transmission channel in the non-3GPP access technology in the following manner: The offloading device is inserted into an N3 interface in the non-3GPP access technology.

In this part, when the session management network element determines to insert the offloading device into the data path of the PDU session based on the characteristic information of the data flow of the PDU session or another factor, there may be the following case. The terminal is in an idle state in the 3GPP access technology and is in a connected state in the non-3GPP access technology, and the session management network element determines to insert the offloading device into the data transmission channel in the 3GPP access technology. In this case, the session management network element may further send the information about the 3GPP access technology to the access and mobility management network element. The information about the 3GPP access technology is used by the access and mobility management network element to notify the terminal to initiate a service request process in the 3GPP access technology.

In an example, the session management network element may further notify the terminal of a transmission policy of the data flow of the PDU session by using the access and mobility management network element. The transmission policy includes information about the data flow, or the transmission policy includes information about the data flow and the access technology type. The information about the data flow may include internet protocol (IP) quintuple information, triplet information, application information, or the like. The IP quintuple information includes a source IP address, a source port, a destination IP address, a destination port, and a transport layer protocol. The triplet information includes at least three pieces of information in the IP quintuple information. The application information includes a type, a name, or the like of an application to which a data packet belongs.

In step 301, the PDU session of the terminal may include at least two PDU sessions. The PDU session of the terminal may include a target PDU session. After determining that the data flow of the PDU session of the terminal needs to be offloaded, the session management network element may further determine the target PDU session. Correspondingly, in this part, that the session management network element determines to insert the offloading device into the data path of the PDU session may include the following. The session management network element determines to insert the offloading device into a data path of the target PDU session.

Further, in this case, the session management network element may further notify the terminal of a data transmission policy of the target PDU session by using the access and mobility management network element. The transmission policy includes information about a data flow of the target PDU session and information about the target PDU session. The information about the target PDU session may include an identifier of the target PDU session, mode information of the PDU session, or the like.

Step 303: The session management network element sends indication information to the access and mobility management network element, where the indication information is used by the access and mobility management network element to send a message to an access network device corresponding to the indication information, the message is used to establish a data transmission channel between the access network device and the offloading device, and the indication information includes information about the 3GPP access technology and/or information about the non-3GPP access technology.

For example, the information about the 3GPP access technology may be an identifier of the 3GPP access technology, and the information about the non-3GPP access technology may be an identifier of the non-3GPP access technology.

In a possible implementation, the indication information is a piece of newly added indication information and is used by the access and mobility management network element to send the user plane information of the offloading device to the access network device corresponding to the indication information. The user plane information of the offloading device is used to establish the data transmission channel between the access network device and the offloading device.

In another possible implementation, the session management network element sends an existing message to the access and mobility management network element. The access and mobility management network element parses the message to determine to send the user plane information of the offloading device to the corresponding access network side device. For example, the message may include one or more pieces of the following information: a core network element identifier (CN NF ID), a message type (for example, an N1 message and/or an N2 message), a message container, a session identifier (Session ID), an access network type (AN Type), a paging priority indication, an allocation and retention priority (ARP), and a location area of validity for N2 session information (Area of validity for the N2 SM information).

Step 304: The access and mobility management network element sends a message to the access network device corresponding to the indication information, where the message is used to establish a data channel between the access network device and the offloading device.

In a possible implementation, the access and mobility management network element determines that the PDU session is a multi-access PDU session (MA-PDU session). The access and mobility management network element sends information to the corresponding access network device based on the received indication information, to establish the PDU session between the access network device and the offloading device (the N3 interface).

The access and mobility management network element determines, in a plurality of manners, that the PDU session is an MA PDU session. This is not limited herein. An example is as follows.

The access and mobility management network element determines, based on identifier information of the PDU session, that the PDU session is a multi-access PDU session. For example, during establishment of the PDU session, the terminal device sends MA-PDU indication information to the network side, and the access and mobility management network element obtains the MA-PDU indication information, and determines that the PDU session is a multi-access PDU session. For another example, if during establishment of the PDU session, the PDU session includes a plurality of PDU session identifiers (for example, a PDU session 1/a PDU session 2), the access and mobility management network element determines that the PDU session is a multi-access PDU session.

In this embodiment, after determining that the data flow of the PDU session of the terminal needs to be offloaded, the session management network element can determine to insert the offloading device into the data transmission channel in the 3GPP access technology and/or the data transmission channel in the non-3GPP access technology, and send the indication information to the access and mobility management network element. Correspondingly, after receiving the indication information, the access and mobility management network element can send the message to the access network device corresponding to the indication information, to establish the data transmission channel between the access network device and the offloading device. Therefore, according to the solution in this embodiment, the offloading device can be inserted into a corresponding data transmission channel, to effectively offload the data flow, thereby reducing redundant processing processes that are possibly caused by insertion of the offloading device.

The solutions provided in the embodiments of this application are further described below with reference to FIG. 4 based on the method shown in FIG. 3. In a method shown in FIG. 4, for content the same as or similar to that in the method shown in FIG. 3, refer to the detailed descriptions of FIG. 3. Details are not described herein again. An example in which a session management network element is an SMF, and an access and mobility management network element is an AMF is used to describe the solutions in the embodiments of this application. The method shown in FIG. 4 includes step 401 to step 407. Step 405 and step 406 are optional parts, and one of step 405 and step 406 is selected and performed, or both step 405 and step 406 are performed.

Step 401: The SMF determines that a data flow of a PDU session of a terminal needs to be offloaded, where the PDU session is established by using a 3GPP access technology and a non-3GPP access technology.

Figure 3:
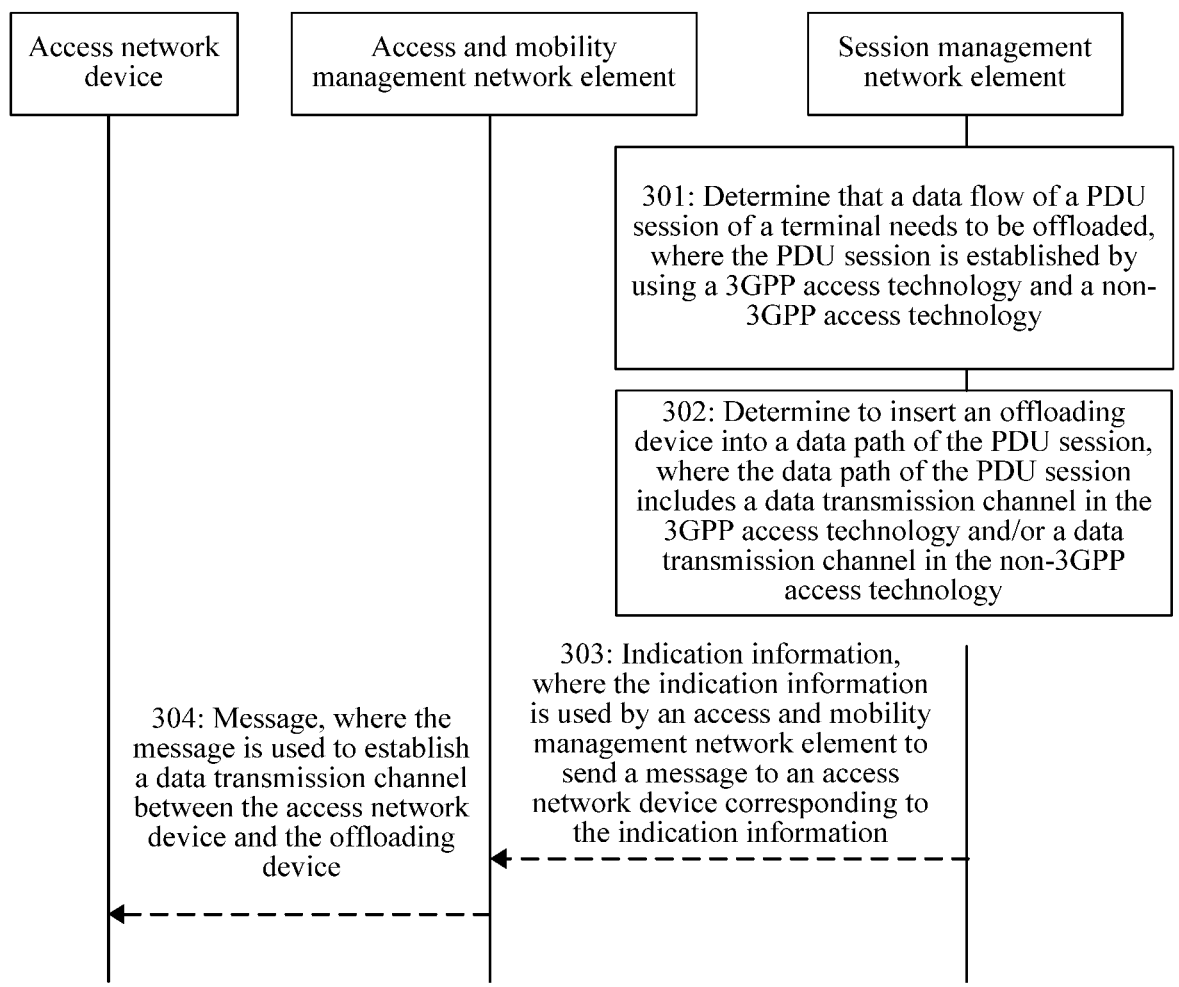
FIG. 3 is a schematic communication diagram of a data transmission channel processing method according to an embodiment of this application.

Step 401 is similar to step 301 in FIG. 3, and reference may be made to the detailed descriptions of step 301. Details are not described herein again.

Step 402: The SMF determines to insert an offloading device into a data path of the PDU session, where the data path of the PDU session includes a data transmission channel in the 3GPP access technology and/or a data transmission channel in the non-3GPP access technology.

Step 402 is similar to step 302 in FIG. 3, and reference may be made to the detailed descriptions of step 302. Details are not described herein again.

Step 403: Establish a user plane data transmission channel between the SMF, the offloading device, a UPF (an anchor 1), and a UPF (an anchor 2), and modify the user plane data transmission channels.

Specifically, in one aspect, the SMF notifies the offloading device of address information of the UPF (the anchor 1) and/or the UPF (the anchor 2), and notifies the UPF (the anchor 1) and/or the UPF (the anchor 2) of address information of the offloading device. In another aspect, the SMF may send, to an access network device, destination address information for transmitting an uplink data flow offloaded by the offloading device, for example, tunnel information, and the SMF sends, to the offloading device, destination address information of an access network device of a downlink data flow. Through the process, the data transmission channel in the PDU session is completely updated, to implement data transmission.

Step 404: The SMF sends indication information to the AMF, where the indication information includes information about the 3GPP access technology and/or information about the non-3GPP access technology.

Step 404 is similar to step 303 in FIG. 3, and reference may be made to the detailed descriptions of step 303 Details are not described herein again.

If the indication information includes only the information about the 3GPP access technology, step 405 is performed, or if the indication information includes only the information about the non-3GPP access technology, step 406 is performed, or if the indication information includes the information about the 3GPP access technology and the information about the non-3GPP access technology, step 405 and step 406 are performed.

Step 405: The AMF sends a message to a 3GPP access network side device, where the message is used to establish a data transmission channel between the 3GPP access network side device and the offloading device.

The 3GPP access network side device is an access network device corresponding to the information about the 3GPP access technology.

Step 406: The AMF sends a message to a non-3GPP access network side device, where the message is used to establish a data transmission channel between the non-3GPP access network side device and the offloading device.

The non-3GPP access network side device is an access network device corresponding to the information about the non-3GPP access technology.

Step 407: In the 3GPP access technology and/or the non-3GPP access technology, establish a user plane data transmission channel, in the PDU session, between the offloading device and an access network device corresponding to the indication information, and modify a user plane data transmission channel between the UPF (the anchor 1) and the access network device corresponding to the indication information and/or between the UPF (the anchor 2) and the access network device corresponding to the indication information.

The UPF (the anchor 1) may be the UPF 2 in FIG. 2B or FIG. 2D, and the UPF (the anchor 2) may be the UPF 3 in FIG. 2C or FIG. 2D.

Figure 4:
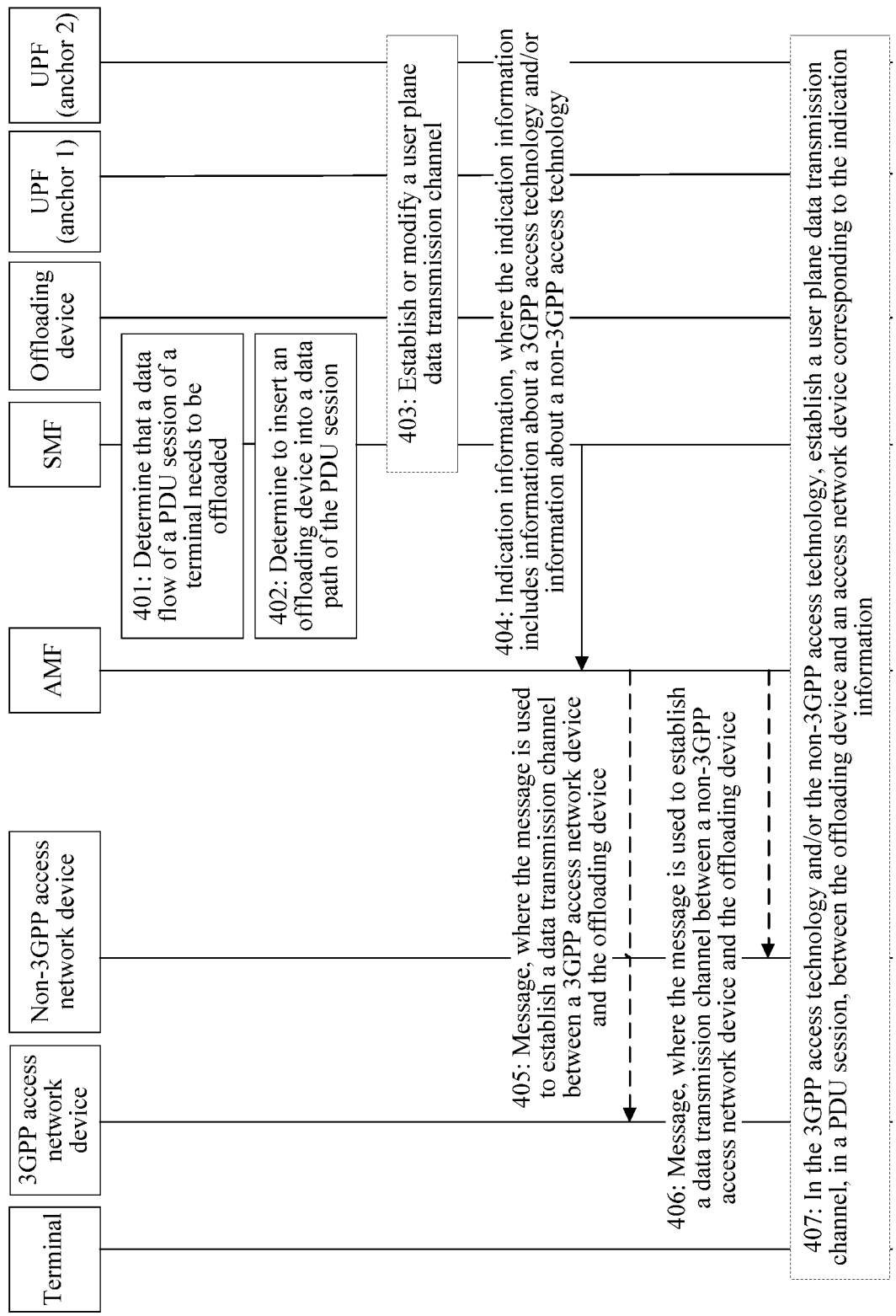
FIG. 4 is a schematic communication diagram of another data transmission channel processing method according to an embodiment of this application.

Based on the method shown in FIG. 4, in a possible case, the SMF entity determines an N3 interface into which the offloading device is to be inserted. For example, the SMF entity determines to insert the offloading device into a 3GPP access network or a non-3GPP access network. Further, in a same access network, the SMF entity may determine a PDU session for which the offloading device is to be inserted, and notify the terminal of a transmission policy applied to the offloading device, so that the terminal can communicate with a DN by using a corresponding access network or a PDU session.

The solutions provided in the embodiments of this application are further described below with reference to FIG. 5 based on the method shown in FIG. 4. A method shown in FIG. 5 includes step 501 to step 509. Step 501 is the same as or similar to step 401 in FIG. 4, and step 503 to step 508 are respectively the same as or similar to step 402 to step 407 in FIG. 4. For related content, refer to the detailed descriptions of FIG. 4. Details are not described herein again.

Figure 5:
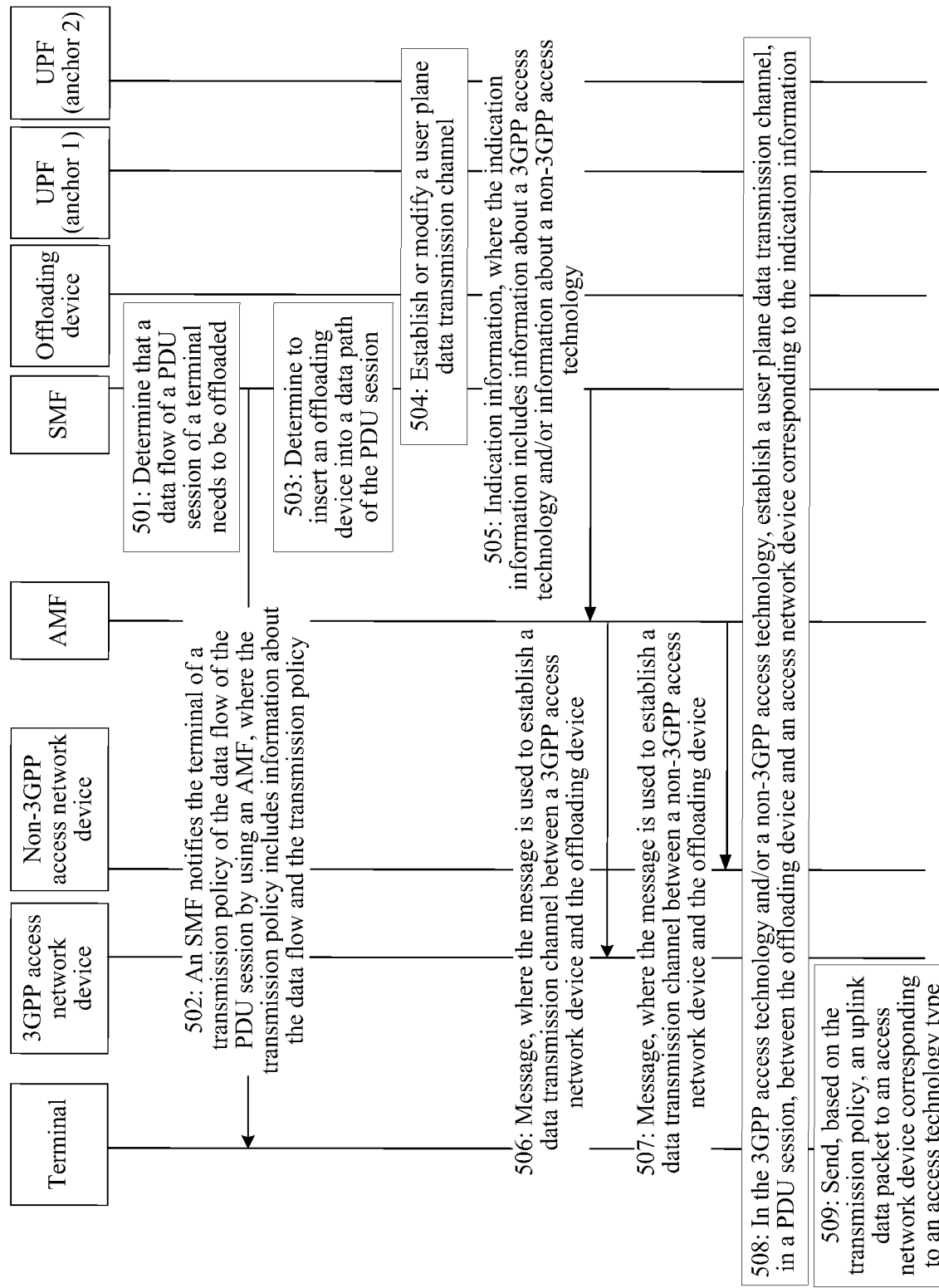
FIG. 5 is a schematic communication diagram of still another data transmission channel processing method according to an embodiment of this application.

A difference between the method shown in FIG. 5 and the method shown in FIG. 4 lies in that the method shown in FIG. 5 further includes step 502 and step 509.

Step 502: The SMF notifies the terminal of a transmission policy of the data flow of the PDU session by using the AMF, where the transmission policy includes information about the data flow and an access technology type.

Step 509: The terminal sends, based on the transmission policy, an uplink data packet to an access network device corresponding to the access technology type.

In the network architecture shown in FIG. 2A, when connections established by the terminal to the DN by using the non-3GPP access network and the 3GPP access network belong to a same session, and the terminal is in an idle state in the 3GPP access network and is in a connected state in the non-3GPP access network, if the SMF entity determines to insert the offloading device into the N3 interface between the 3GPP access network and the UPF entity, the SMF entity may notify the terminal to initiate a service request process by using the non-3GPP access network, to restore a connection of the terminal in the 3GPP access network, so as to insert the offloading device between the 3GPP access network and the UPF entity.

On this basis, the embodiments of this application provide another data transmission channel processing method, and an access and mobility management network element, a session management network element, a user plane network element, a terminal, and a system that are based on the method. The method includes determining, by an access and mobility management network element, that a connection management state of a terminal in a 3GPP access technology is an idle state and a connection management state of the terminal in a non-3GPP access technology is a connected state, and sending, by the access and mobility management network element, a notification message to the terminal by using the non-3GPP access technology, where the notification message is used to notify the terminal to initiate a service request process in the 3GPP access technology.

According to the solutions in the embodiments of this application, redundant signaling operations that are caused by insertion of an offloading device for a PDU session in an idle state can be reduced.

Figure 6:
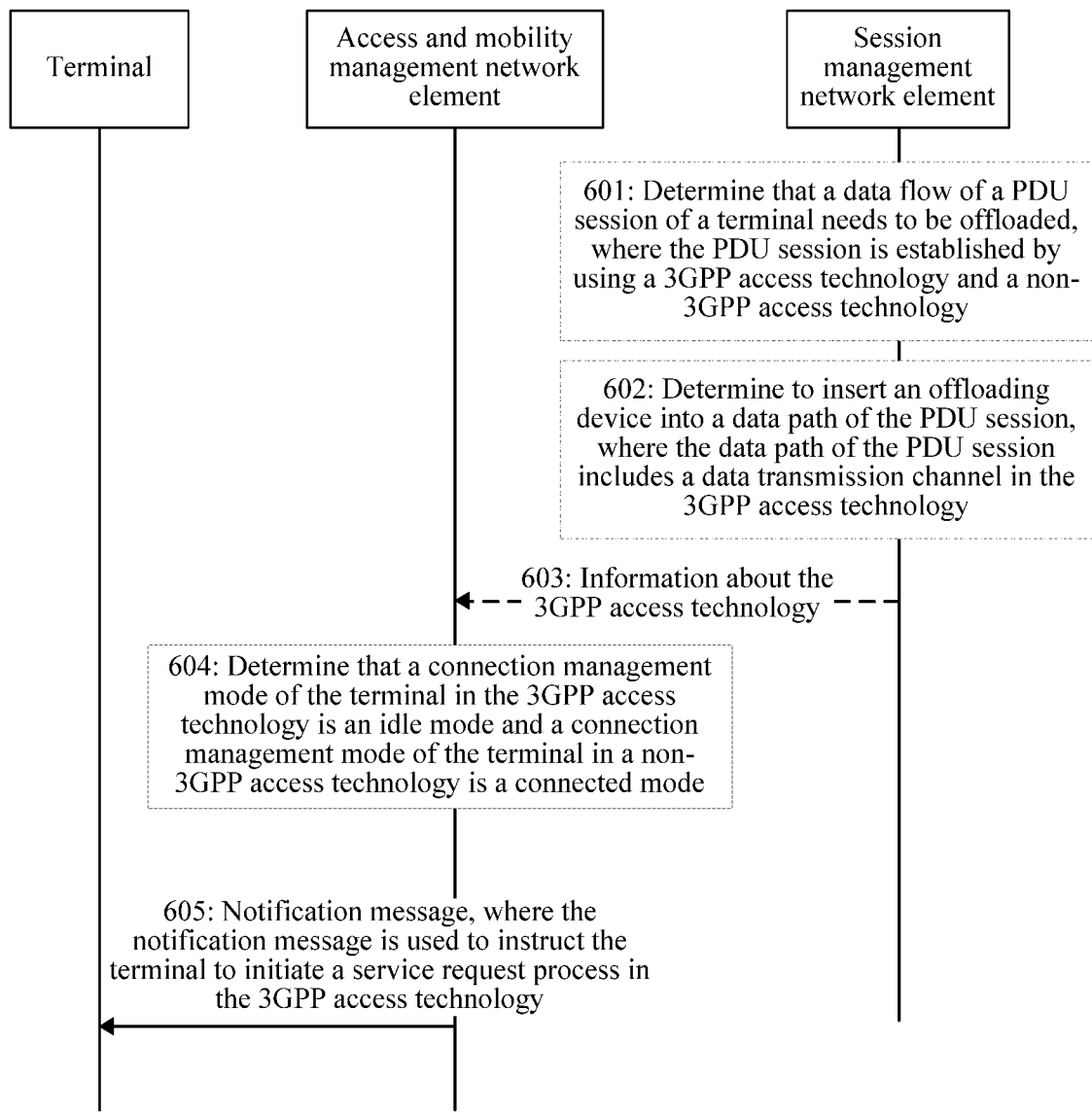
FIG. 6 is a schematic communication diagram of yet another data transmission channel processing method according to an embodiment of this application.

The processing method is described below with reference to FIG. 6. A method shown in FIG. 6 includes step 601 to step 605, and step 601 to step 603 are optional parts.

Step 601: A session management network element determines that a data flow of a PDU session of a terminal needs to be offloaded, where the PDU session is established by using a 3GPP access technology and a non-3GPP access technology.

Step 601 is the same as or similar to step 301 in FIG. 3, and reference may be made to the detailed descriptions of step 301. Details are not described herein again.

Step 602: The session management network element determines to insert an offloading device into a data path of the PDU session, where the data path of the PDU session includes a data transmission channel in the 3GPP access technology.

Step 602 is similar to an implementation process in which the session management network element determines to insert the offloading device into the data transmission channel in the 3GPP access technology in step 302 in FIG. 3, and reference may be made to the detailed descriptions of step 302. Details are not described herein again.

Step 603: An access and mobility management network element receives information about the 3GPP access technology from the session management network element.

Step 604: The access and mobility management network element determines that a connection management state of the terminal in the 3GPP access technology is an idle state and a connection management state of the terminal in a non-3GPP access technology is a connected state.

Step 605: The access and mobility management network element sends a notification message to the terminal by using the non-3GPP access technology, where the notification message is used to notify the terminal to initiate a service request process in the 3GPP access technology.

In an example, the access and mobility management network element may further start a timer, and if the timer expires and the access and mobility management network element does not receive a service request message of the terminal, the access and mobility management network element sends a paging message to the terminal by using the 3GPP access technology. Duration of the timer may be determined based on quality of service information of a downlink data packet for the terminal. For example, the duration of the timer is determined based on allocation and retention priority (allocation/retention priority, ARP) or a QoS class identifier (QCI) in quality of service (QoS) information of the data flow. Specifically, if some data flows have relatively high priorities or need to be preferentially processed or need to be transmitted with higher reliability, or the like, duration of timers of these data flows may be set to a relatively short time, on the contrary, duration of the timers may be set to a relatively long time.

Figure 7:
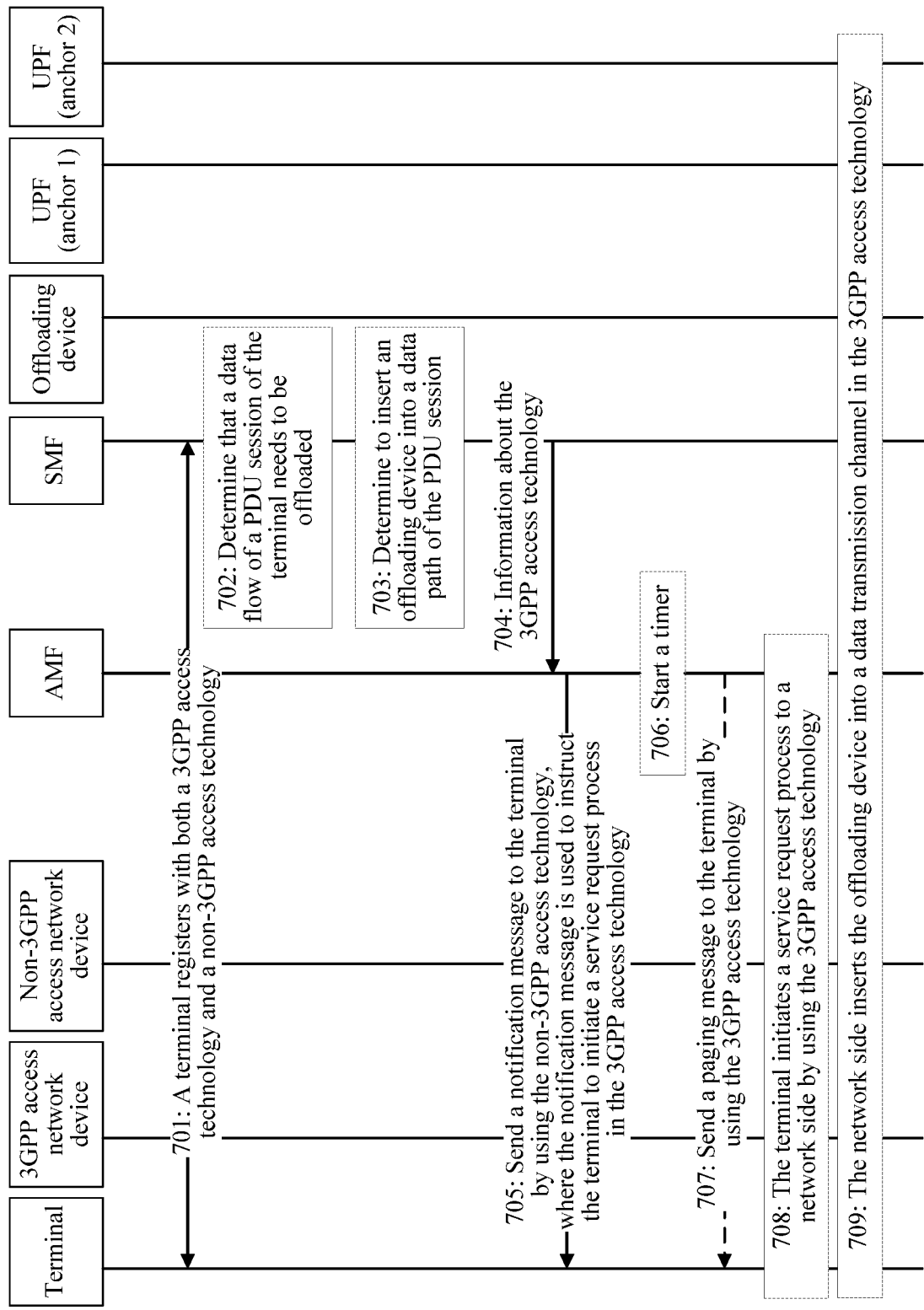
FIG. 7 is a schematic communication diagram of yet another data transmission channel processing method according to an embodiment of this application.

The solutions provided in the embodiments of this application are further described below with reference to FIG. 7 based on the method shown in FIG. 6. In a method shown in FIG. 7, for content the same as or similar to that in the method shown in FIG. 6, refer to the detailed descriptions of FIG. 6. Details are not described herein again. An example in which a session management network element is an SMF, and an access and mobility management network element is an AMF is used to describe the solutions in the embodiments of this application. The method shown in FIG. 7 includes step 701 to step 709. Step 707 and step 708 are optional parts, and one of step 707 and step 708 is selected and performed.

Step 701: A terminal registers with both a 3GPP access technology and a non-3GPP access technology.

Step 702: The SMF determines that a data flow of a PDU session of the terminal needs to be offloaded, where the PDU session is established by using the 3GPP access technology and the non-3GPP access technology.

Step 702 is similar to step 301 in FIG. 3, and reference may be made to the detailed descriptions of step 301. Details are not described herein again.

Step 703: The SMF determines to insert an offloading device into a data path of the PDU session, where the data path of the PDU session includes a data transmission channel in the 3GPP access technology.

Step 703 is similar to an implementation process in which the session management network element determines to insert the offloading device into the data transmission channel in the 3GPP access technology in step 302 in FIG. 3, and reference may be made to the detailed descriptions of step 302. Details are not described herein again.

Step 704: The SMF sends information about the 3GPP access technology to the AMF.

Step 705: The AMF determines that a connection management state of the terminal in the 3GPP access technology is an idle state and a connection management state of the terminal in the non-3GPP access technology is a connected state, and then sends a notification message to the terminal by using the non-3GPP access technology, where the notification message is used to notify the terminal to initiate a service request process in the 3GPP access technology.

Step 706: The AMF starts a timer.

Duration of the timer may be determined based on quality of service information of a downlink data packet for the terminal.

Step 707: If the timer expires and the AMF does not receive a service request message of the terminal, the AMF sends a paging message to the terminal by using the 3GPP access technology.

Step 708: The terminal initiates a service request process to a network side by using the 3GPP access technology.

Step 709: The network side inserts the offloading device into the data transmission channel in the 3GPP access technology.

The solutions provided in the embodiments of this application are described above mainly from a perspective of interaction between different network elements. It may be understood that to implement the foregoing functions, the session management network element, the access and mobility management network element, the user plane network element, and the terminal include corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, functional units of the session management network element, the access and mobility management network element, the terminal, and the like may be obtained through division according to the foregoing examples in the method, for example, the functional units may be obtained through division based on each corresponding function, or two or more functions may be integrated into one processing unit. The integrated unit may be implemented in a form of hardware, or may be implemented in a form of a software functional unit. It should be noted that in the embodiments of this application, unit division is an example, and is merely a logical function division. There may be another division manner in actual implementation.

Figure 8:
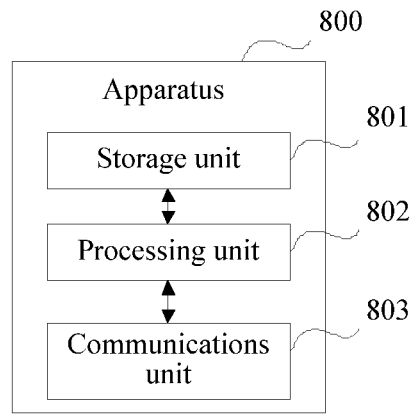
FIG. 8 is a schematic block diagram of an apparatus according to an embodiment of this application.

When an integrated unit is used, FIG. 8 is a possible example block diagram of an apparatus according to an embodiment of this application. The apparatus 800 may exist in a form of software, or may be a session management network element or a chip in a session management network element. FIG. 8 is a possible schematic block diagram of the apparatus in the embodiments of this application. The apparatus 800 includes a processing unit 802 and a communications unit 803. The processing unit 802 is configured to control and manage an action of the apparatus. For example, the processing unit 802 is configured to support the apparatus in performing the processes 301, 302, and 303 in FIG. 3, the processes 401 to 404 and the process 407 in FIG. 4, the processes 501 to 505 and the process 508 in FIG. 5, the processes 601 to 603 in FIG. 6, the processes 701 to 704 and the process 709 in FIG. 7, and/or another process used for the technology described in this specification. The communications unit 803 is configured to support communication between the apparatus and an access and mobility management network element or a user plane network element. The apparatus may further include a storage unit 801, configured to store program code and data of the apparatus.

Specifically, the processing unit is configured to determine that a data flow of a packet data unit PDU session of a terminal needs to be offloaded, where the PDU session is established by using a 3rd generation partnership project 3GPP access technology and a non-3GPP access technology, and determine to insert an offloading device into a data path of the PDU session, where the data path of the PDU session includes a data transmission channel in the 3GPP access technology and/or a data transmission channel in the non-3GPP access technology.

In a possible implementation, the processing unit is specifically configured to, if the terminal is in a connected state in the 3GPP access technology and is in an idle state in the non-3GPP access technology, determine to insert the offloading device into the data transmission channel in the 3GPP access technology, or if the terminal is in an idle state in the 3GPP access technology and is in a connected state in the non-3GPP access technology, determine to insert the offloading device into the data transmission channel in the non-3GPP access technology, or if the terminal is in a connected state in both the 3GPP access technology and the non-3GPP access technology, determine to insert the offloading device into both the data transmission channel in the 3GPP access technology and the data transmission channel in the non-3GPP access technology.

In a possible implementation, the processing unit is specifically configured to determine, based on characteristic information of the data flow of the PDU session, to insert the offloading device into the data path of the PDU session.

In a possible implementation, the characteristic information of the data flow includes an access technology type, and the processing unit is specifically configured to if the access technology type is the 3GPP access technology, determine to insert the offloading device into the data transmission channel in the 3GPP access technology, or if the access technology type is the non-3GPP access technology, determine to insert the offloading device into the data transmission channel in the non-3GPP access technology, or if the access technology type includes the 3GPP access technology and the non-3GPP access technology, determine to insert the offloading device into both the data transmission channel in the 3GPP access technology and the data transmission channel in the non-3GPP access technology, orb the characteristic information of the data flow does not include an access technology type, and the processing unit is specifically configured to determine to insert the offloading device into both the data transmission channel in the 3GPP access technology and the data transmission channel in the non-3GPP access technology.

In a possible implementation, the communications unit is configured to notify the terminal of a transmission policy of the data flow of the PDU session by using the access and mobility management network element, where the transmission policy includes information about the data flow and the access technology type.

In a possible implementation, the communications unit is configured to send indication information to the access and mobility management network element, where the indication information is used by the access and mobility management network element to send a message to an access network device corresponding to the indication information, the message is used to establish a data transmission channel between the access network device and the offloading device, and the indication information includes information about the 3GPP access technology and/or information about the non-3GPP access technology.

In a possible implementation, the PDU session includes a target PDU session, and the processing unit is further configured to after determining that the data flow of the PDU session of the terminal needs to be offloaded, determine the target PDU session, and the processing unit is specifically configured to determine to insert the offloading device into a data path of the target PDU session.

In a possible implementation, the communications unit is configured to notify the terminal of a transmission policy of the data flow of the target PDU session by using the access and mobility management network element, where the transmission policy includes information about the data flow and information about the target PDU session.

In a possible implementation, the terminal is in an idle state in the 3GPP access technology and is in a connected state in the non-3GPP access technology, the processing unit determines to insert the offloading device into the data transmission channel in the 3GPP access technology, and the communications unit is configured to send the information about the 3GPP access technology to the access and mobility management network element, where the information about the 3GPP access technology is used by the access and mobility management network element to notify the terminal to initiate a service request process in the 3GPP access technology.

The processing unit 802 may be a processor or a controller, for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit 802 may implement or execute various example logical blocks, units, and circuits described with reference to content disclosed in this application. Alternatively, the processor may be a combination of processors implementing a computing function, for example, a combination of one or more microprocessors, or a combination of a DSP and a microprocessor. The communications unit 803 may be a communications interface, and the communications interface is a general name. During specific implementation, the communications interface may include a plurality of interfaces, for example, may include an N4 interface between an SMF and a UPF, an N11 interface between the SMF and an AMF, and/or another interface. The storage unit 801 may be a memory.

Figure 9:
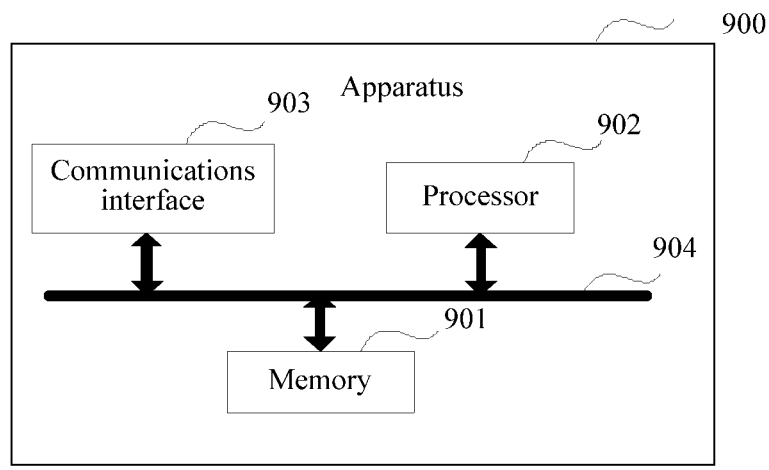
FIG. 9 is a schematic structural diagram of an apparatus according to an embodiment of this application.

When the processing unit 802 is a processor, the communications unit 803 is a communications interface, and the storage unit 801 is a memory, the apparatus 800 in this embodiment of this application may be an apparatus 900 shown in FIG. 9.

Referring to FIG. 9, the apparatus 900 includes a processor 902, a communications interface 903, and a memory 901. Optionally, the apparatus 900 may further include a bus 904. The communications interface 903, the processor 902, and the memory 901 may be connected to each other by using the bus 904. The bus 904 may be a peripheral component interconnect (PCI) bus, an extended industry standard architecture (EISA) bus, or the like. The bus 904 may be classified into an address bus, a data bus, a control bus, and the like. For ease of representation, only one thick line is used to represent the bus 904 in FIG. 9, but this does not mean that there is only one bus or only one type of bus.

The apparatuses shown in FIG. 8 and FIG. 9 each may be a session management network element, for example, may be the SMF in FIG. 2A to FIG. 2F.

Figure 10:
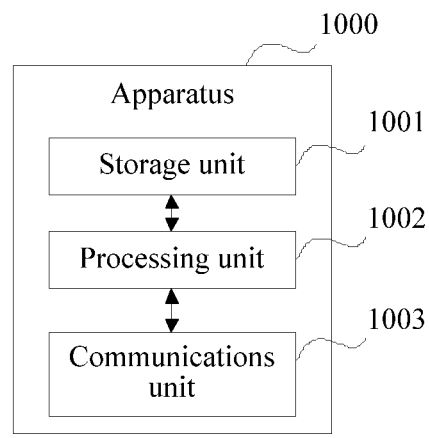
FIG. 10 is a schematic block diagram of another apparatus according to an embodiment of this application.

When an integrated unit is used, FIG. 10 is a possible example block diagram of another apparatus according to an embodiment of this application. The apparatus 1000 may exist in a form of software, or may be an access and mobility management network element or a chip in an access and mobility management network element. FIG. 10 is a possible schematic block diagram of the apparatus 1000 in the embodiments of this application. The apparatus 1000 includes a processing unit 1002 and a communications unit 1003. The processing unit 1002 is configured to control and manage an action of the apparatus. For example, the processing unit 1002 is configured to support the apparatus in performing the process 304 in FIG. 3, the processes 405, 406, and 407 in FIG. 4, the processes 502, 506, 507, and 508 in FIG. 5, the processes 604 and 605 in FIG. 6, the process 701 and the processes 705 to 708 in FIG. 7, and/or another process used for the technology in this specification. The communications unit 1003 is configured to support communication between the apparatus and a session management network element, a 3GPP access network or a non-3GPP access network. The apparatus may further include a storage unit 1001, configured to store program code and data of the apparatus moo.

The processing unit 1002 may be a processor or a controller, for example, may be a CPU, a general-purpose processor, a DSP, an ASIC, an FPGA or another programmable logic device, a transistor logic device, a hardware component, or any combination thereof. The processing unit 1002 may implement or execute various example logical blocks, units, and circuits described with reference to content disclosed in this application. Alternatively, the processor may be a combination of processors implementing a computing function, for example, a combination of one or more microprocessors, or a combination of a DSP and a microprocessor. The communications unit 1003 may be a communications interface, and the communications interface is a general name. During specific implementation, the communications interface may include a plurality of interfaces, for example, may include an N11 interface between an AMF and an SMF, an N2 interface between the AMF and an N3IWF, an N2 interface between the AMF and a 3GPP access network, and/or another interface. The storage unit 1001 may be a memory.

Figure 11:
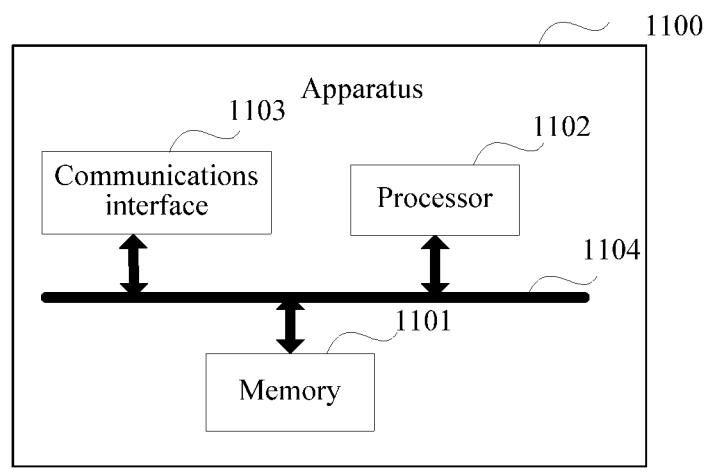
FIG. 11 is a schematic structural diagram of another apparatus according to an embodiment of this application.

When the processing unit 1002 is a processor, the communications unit 1003 is a communications interface, and the storage unit 1001 is a memory, the apparatus in this embodiment of this application may be an apparatus shown in FIG. 11.

Referring to FIG. 11, the apparatus 1100 includes a processor 1102, a communications interface 1103, and a memory 1101. Optionally, the apparatus 1100 may further include a bus 1104. The communications interface 1103, the processor 1102, and the memory 1101 may be connected to each other by using the bus 1104. The bus 1104 may be a PCI bus, an EISA bus, or the like. The bus 1104 may be classified into an address bus, a data bus, a control bus, and the like. For ease of representation, only one thick line is used to represent the bus 1104 in FIG. 11, but this does not mean that there is only one bus or only one type of bus.

The apparatuses shown in FIG. 10 and FIG. 11 each may be an access and mobility management network element, for example, may be the AMF in FIG. 2A to FIG. 2F.

In a possible implementation, the communications unit is configured to receive indication information sent by a session management network element, and send user plane information of an offloading device to a non-3GPP access network side device and/or a 3GPP access network side device based on the indication information.

In a possible implementation, the processing unit is configured to determine a connection management state of a terminal in a 3GPP access technology and/or a connection management state of the terminal in a non-3GPP access technology. The communications unit is configured to send the user plane information of the offloading device to the non-3GPP access network side device and/or the 3GPP access network side device based on the indication information and the connection management state of the terminal in the 3GPP access technology and/or the connection management state of the terminal in the non-3GPP access technology.

In a possible implementation, the indication information includes information about the 3GPP access technology and/or information about the non-3GPP access technology. The communications unit is configured to send the user plane information of the offloading device to the non-3GPP access network side device and/or the 3GPP access network side device corresponding to the indication information.

In a possible implementation, the indication information includes information about the 3GPP access technology and information about the non-3GPP access technology. If the processing unit determines that the connection management state of the terminal in the 3GPP access technology is an idle state, the communications unit is configured to send the user plane information of the offloading device to the non-3GPP access network side device, where the user plane information of the offloading device is used to establish a data transmission channel between the non-3GPP access network side device and the offloading device.

In a possible implementation, the indication information includes information about the 3GPP access technology and information about the non-3GPP access technology. If the processing unit determines that the connection management state of the terminal in the non-3GPP access technology is an idle state, the communications unit is configured to send the user plane information of the offloading device to the 3GPP access network side device, where the user plane information of the offloading device is used to establish a data transmission channel between the 3GPP access network side device and the offloading device.

According to another aspect, the processor performs the following operation based on a computer instruction stored in the memory, including receiving indication information sent by a session management network element, and sending user plane information of an offloading device to a non-3GPP access network side device and/or a 3GPP access network side device based on the indication information.

In a possible implementation, the access and mobility management network element determines a connection management state of a terminal in a 3GPP access technology and/or a connection management state of the terminal in a non-3GPP access technology, and the sending, by the access and mobility management network element, user plane information of an offloading device to a non-3GPP access network side device and/or a 3GPP access network side device based on the indication information includes sending, by the access and mobility management network element, the user plane information of the offloading device to the non-3GPP access network side device and/or the 3GPP access network side device based on the indication information and the connection management state of the terminal in the 3GPP access technology and/or the connection management state of the terminal in the non-3GPP access technology.

In a possible implementation, the indication information includes information about the 3GPP access technology and/or information about the non-3GPP access technology, and the sending, by the access and mobility management network element, user plane information of an offloading device to a non-3GPP access network side device and/or a 3GPP access network side device based on the indication information includes sending, by the access and mobility management network element, the user plane information of the offloading device to the non-3GPP access network side device and/or the 3GPP access network side device corresponding to the indication information.

In a possible implementation, the indication information includes information about the 3GPP access technology and information about the non-3GPP access technology, and the sending, by the access and mobility management network element, the user plane information of the offloading device to the non-3GPP access network side device and/or the 3GPP access network side device based on the indication information and the connection management state of the terminal in the 3GPP access technology and/or the connection management state of the terminal in the non-3GPP access technology includes if the connection management state of the terminal in the 3GPP access technology is an idle state, sending, by the access and mobility management network element, the user plane information of the offloading device to the non-3GPP access network side device, where the user plane information of the offloading device is used to establish a data transmission channel between the non-3GPP access network side device and the offloading device.

In a possible implementation, the indication information includes information about the 3GPP access technology and information about the non-3GPP access technology, and the sending, by the access and mobility management network element, the user plane information of the offloading device to the non-3GPP access network side device and/or the 3GPP access network side device based on the indication information and the connection management state of the terminal in the 3GPP access technology and/or the connection management state of the terminal in the non-3GPP access technology includes if the connection management state of the terminal in the non-3GPP access technology is the idle state, sending, by the access and mobility management network element, the user plane information of the offloading device to the 3GPP access network side device, where the user plane information of the offloading device is used to establish a data transmission channel between the 3GPP access network side device and the offloading device.

In various embodiments of this application, for ease of understanding, a plurality of examples are used for description. However, these examples are merely examples, and it does not mean that the examples are optimal implementations for implementing this application.

In various embodiments of this application, for ease of descriptions, request message, a response message, and various other message names are used. However, these messages are merely used as examples to describe content that needs to be carried or a function that needs to be implemented, and specific names of the messages are not intended to limit this application, for example, the message may be a first message, a second message, or a third message. These messages may be some specific messages, or may be some fields in the messages. These messages may further represent various service operations.

Methods or algorithm steps described in combination with the content disclosed in the embodiments of this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or a storage medium in any other form well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the session management network element, the access and mobility management network element, or the terminal. Certainly, the processor and the storage medium may also exist in the session management network element, the access and mobility management network element, or the terminal as discrete components.

A person skilled in the art should be aware that in the foregoing one or more examples, functions described in the embodiments of this application may be implemented by hardware, software, firmware, or any combination thereof. When the present invention is implemented by software, the functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

In the foregoing specific implementations, the objectives, technical solutions, and beneficial effects of the embodiments of this application are further described in detail. It should be understood that the foregoing descriptions are merely specific implementations of the embodiments of this application, but are not intended to limit the protection scope of the embodiments of this application. Any modification, equivalent replacement, or improvement made based on the technical solutions of the embodiments of this application shall fall within the protection scope of the embodiments of this application.

What is claimed is:

1. A data transmission channel processing method, comprising:
   determining, by a session management network element, that a data flow of a packet data unit (PDU) session of a terminal needs to be offloaded, wherein the PDU session is established using both a 3rd generation partnership project (3GPP) access technology and a non-3GPP access technology; and
   determining, by the session management network element, according to at least one of a state of a data transmission channel in the 3GPP access technology or a state of a data transmission channel in the non-3GPP access technology, to insert an offloading device into a data path of the PDU session, wherein the data path of the PDU session comprises at least one of the data transmission channel in the 3GPP access technology or the data transmission channel in the non-3GPP access technology.

2. The method according to claim 1, wherein the state of the data transmission channel in the 3GPP access technology comprises at least one of a user plane active state or a user plane inactive state, and wherein the state of the data transmission channel in the non-3GPP access technology comprises at least one of a user plane active state or a user plane inactive state.

3. The method according to claim 2, wherein the determining, by the session management network element according to the at least one the state of the data transmission channel in the 3GPP access technology or a state of the data transmission channel in the non-3GPP access technology, to insert the offloading device into the data path of the PDU session comprises performing at least one of:
   determining, by the session management network element, in response to the state of the data transmission channel in the 3GPP access technology being the user plane inactive state, to insert the offloading device into the data transmission channel in the non-3GPP access technology; or
   determining, by the session management network element, in response to the state of the data transmission channel in the non-3GPP access technology being the user plane inactive state, to insert the offloading device into the data transmission channel in the 3GPP access technology.

4. The method according to claim 3, wherein the method further comprises performing at least one of:

sending, by the session management network element, indication information to an access and mobility management network element, wherein the indication information indicates to the access and mobility management network element to send user plane information of the offloading device to a non-3GPP access network side device; or sending, by the session management network element, indication information to an access and mobility management network element, wherein the indication information indicates to the access and mobility management network element to send user plane information of the offloading device to a 3GPP access network side device.

5. The method according to claim 1, wherein the method further comprises:
   determining, by the session management network element, that the PDU session is a multi-access PDU session.

6. The method according to claim 5, wherein the determining to insert the offloading device into the data path of the PDU session comprises:
   determining, by the session management network element, to insert the offloading device into both the data transmission channel in the 3GPP access technology and the data transmission channel in the non-3GPP access technology.

7. The method according to claim 6, wherein the method further comprises:
   sending, by the session management network element, indication information to the access and mobility management network element, wherein the access and mobility management network element determines according to the indication information and further according to connection management states of the terminal in the 3GPP access technology and the non-3GPP access technology, to insert the offloading device into the data path of the PDU session.

8. The method according to claim 1, wherein the determining to insert the offloading device into the data path of the PDU session comprises:
   determining, by the session management network element according to characteristic information of the data flow of the PDU session, to insert the offloading device into the data path of the PDU session.

9. An apparatus, comprising:
   at least one processor; and
   a memory storing a program for execution by the at least one processor, the program including instructions for:
      determining that a data flow of a packet data unit (PDU) session of a terminal needs to be offloaded, wherein the PDU session is established using both a 3rd generation partnership project (3GPP) access technology and a non-3GPP access technology; and
      determining, based on at least one of a state of a data transmission channel in the 3GPP access technology or a state of a data transmission channel in the non-3GPP access technology, to insert an offloading device into a data path of the PDU session, wherein the data path of the PDU session comprises at least one of the data transmission channel in the 3GPP access technology or the data transmission channel in the non-3GPP access technology.

10. The apparatus according to claim 9, wherein the state of the data transmission channel in the 3GPP access technology comprises at least one of a user plane active state or a user plane inactive state, and the state of the data transmission channel in the non-3GPP access technology comprises at least one of a user plane active state or a user plane inactive state.

11. The apparatus according to claim 10, wherein the instructions for determining, according to at least one of a state of the data transmission channel in the 3GPP access technology or a state of the data transmission channel in the non-3GPP access technology, to insert the offloading device into the data path of the PDU session comprise instructions for performing at least one of:
   determining, in response to the state of the data transmission channel in the 3GPP access technology being the user plane inactive state, to insert the offloading device into the data transmission channel in the non-3GPP access technology; or
   determining, in response to the state of the data transmission channel in the non-3GPP access technology being the user plane inactive state, to insert the offloading device into the data transmission channel in the 3GPP access technology.

12. The apparatus according to claim 11, wherein the program further includes instructions for performing at least one of:
   sending indication information to an access and mobility management network element, wherein the indication information indicates to the access and mobility management network element to send user plane information of the offloading device to a non-3GPP access network side device; or
   sending indication information to an access and mobility management network element, wherein the indication information indicates to the access and mobility management network element to send user plane information of the offloading device to a 3GPP access network side device.

13. The apparatus according to claim 9, wherein the program further includes instructions for:
   determining that the PDU session is a multi-access PDU session.

14. The apparatus according to claim 13, wherein the instructions for determining to insert the offloading device into the data path of the PDU session comprise instructions for:
   determining to insert the offloading device into both the data transmission channel in the 3GPP access technology and the data transmission channel in the non-3GPP access technology.

15. The apparatus according to claim 14, wherein the program further includes instructions for:
   sending indication information to the access and mobility management network element, wherein the access and mobility management network element determines, according to the indication information and further according to connection management states of the terminal in the 3GPP access technology and the non-3GPP access technology, to insert the offloading device into the data path of the PDU session.

16. The apparatus according to claim 9, wherein the instructions for determining to insert the offloading device into the data path of the PDU session comprise instructions for:

determining, according to characteristic information of the data flow of the PDU session, to insert the offloading device into the data path of the PDU session.

17. A non-transitory computer-readable storage medium, wherein the non-transitory computer-readable storage medium stores an instruction, and when the instruction is run on a computer, the computer is enabled to perform:
   determining that a data flow of a packet data unit (PDU) session of a terminal needs to be offloaded, wherein the PDU session is established using both a 3rd generation partnership project (3GPP) access technology and a non-3GPP access technology; and
   determining, based on at least one of a state of a data transmission channel in the 3GPP access technology or a state of a data transmission channel in the non-3GPP access technology, to insert an offloading device into a data path of the PDU session, wherein the data path of the PDU session comprises at least one of the data transmission channel in the 3GPP access technology or the data transmission channel in the non-3GPP access technology.

18. A system, comprising:
   a session management network element; and
   an access and mobility management network element communicating with the session management network element;
   wherein the session management network element is configured to perform:
      determining that a data flow of a packet data unit (PDU) session of a terminal needs to be offloaded, wherein the PDU session is established using both a 3rd generation partnership project (3GPP) access technology and a non-3GPP access technology; and
      determining, based on at least one of a state of a data transmission channel in the 3GPP access technology or a state of a data transmission channel in the non-3GPP access technology, to insert an offloading device into a data path of the PDU session, wherein the data path of the PDU session comprises at least one of the data transmission channel in the 3GPP access technology or the data transmission channel in the non-3GPP access technology.

* * * * *